United States Patent
Kahn et al.

(10) Patent No.: US 10,094,027 B2
(45) Date of Patent: Oct. 9, 2018

(54) SELF-CLEANING SUBSTRATES AND METHODS FOR MAKING THE SAME

(71) Applicant: ALCOA INC., Pittsburgh, PA (US)

(72) Inventors: Jay A. Kahn, Houston, TX (US);
Grant Nintzel, Alpharetta, GA (US);
Yves Biehlmann, Pfaffenheim (FR);
Craig Belnap, Johns Creek, GA (US);
Clinton Zediak, Tarentum, PA (US);
John Keener, Freeport, PA (US);
James Bell, Monroeville, PA (US);
Albert L. Askin, Lower Burrell, PA (US); Paula L. Kolek, Tarentum, PA (US); Jean Ann Skiles, Gibsonia, PA (US)

(73) Assignee: ARCONIC INC., Pittsburgh, PA (US)

( * ) Notice: Subject to any disclaimer, the term of this patent is extended or adjusted under 35 U.S.C. 154(b) by 0 days.

(21) Appl. No.: 14/108,064

(22) Filed: Dec. 16, 2013

(65) Prior Publication Data

US 2014/0106074 A1    Apr. 17, 2014

Related U.S. Application Data

(63) Continuation of application No. 12/569,673, filed on Sep. 29, 2009, now Pat. No. 8,617,665.

(60) Provisional application No. 61/230,953, filed on Aug. 3, 2009.

(51) Int. Cl.
| | |
|---|---|
| *C23C 28/04* | (2006.01) |
| *C23C 28/00* | (2006.01) |
| *B05D 5/08* | (2006.01) |
| *C09D 5/16* | (2006.01) |
| *C23C 26/00* | (2006.01) |
| *B05D 1/28* | (2006.01) |
| *B05D 7/00* | (2006.01) |

(52) U.S. Cl.
CPC ............... *C23C 28/00* (2013.01); *B05D 5/08* (2013.01); *C09D 5/1618* (2013.01); *C09D 5/1693* (2013.01); *C23C 26/00* (2013.01); *B05D 1/28* (2013.01); *B05D 7/56* (2013.01); *B05D 2202/25* (2013.01)

(58) Field of Classification Search
CPC .......... B05D 1/28; B05D 7/56; C09D 5/1618; C09D 5/1693
USPC ........................................... 427/419.2, 419.3
See application file for complete search history.

(56) References Cited

U.S. PATENT DOCUMENTS

| | | | |
|---|---|---|---|
| 6,294,247 B1 * | 9/2001 | Watanabe | B01J 21/063 428/312.8 |
| 2005/0252108 A1 * | 11/2005 | Sanderson et al. | 52/171.3 |
| 2005/0266248 A1 * | 12/2005 | Millero et al. | 428/411.1 |

(Continued)

OTHER PUBLICATIONS

Office Action, dated Dec. 1, 2014, from related, co-owned Chinese Application No. 201010625232.8.

(Continued)

*Primary Examiner* — Alexander Marion Weddle
(74) *Attorney, Agent, or Firm* — Greenberg Traurig, LLP

(57) ABSTRACT

A methods, apparatus and compositions for producing colored, self-cleaning substrates by roll coating are provided. The roll coated, colored, self-cleaning substrates retain the predetermined color and a predetermined gloss of the colored coating, thereby facilitating their use in architectural applications. The roll coated, colored, self-cleaning substrates may be iridescent-free.

17 Claims, 19 Drawing Sheets

(56) References Cited

U.S. PATENT DOCUMENTS

2006/0045975 A1\* 3/2006 Yamaji et al. ................ 427/355
2006/0147634 A1\* 7/2006 Strauss ........................ 427/299
2007/0190308 A1\* 8/2007 Brand ...................... B05D 5/00
                                                          428/323
2008/0309122 A1\* 12/2008 Smith et al. ............... 296/180.1

OTHER PUBLICATIONS

Third party observations dated May 7, 2015, from related European Patent Application No. 10182818.4 (attachments mentioned not filed).

\* cited by examiner

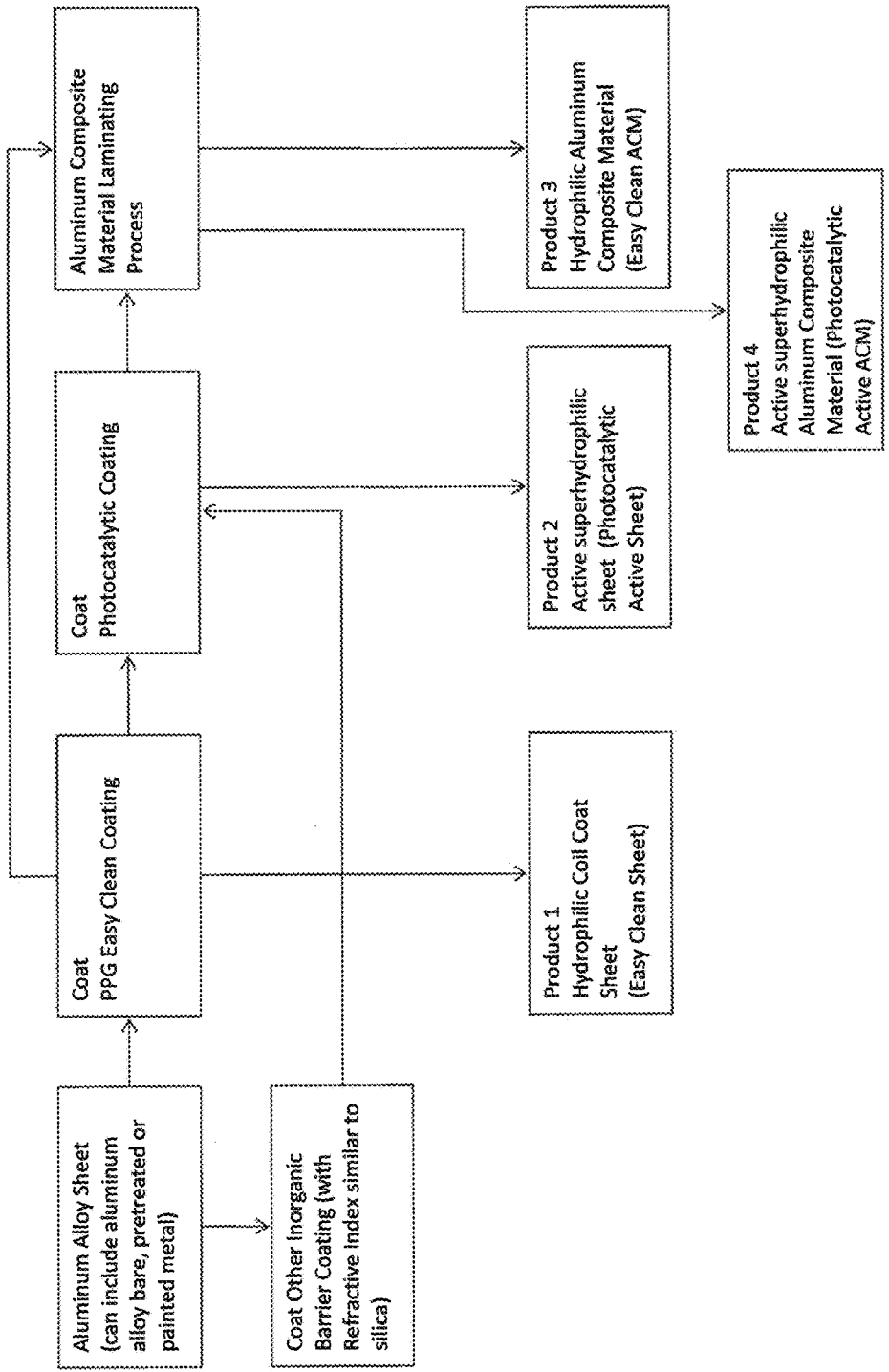

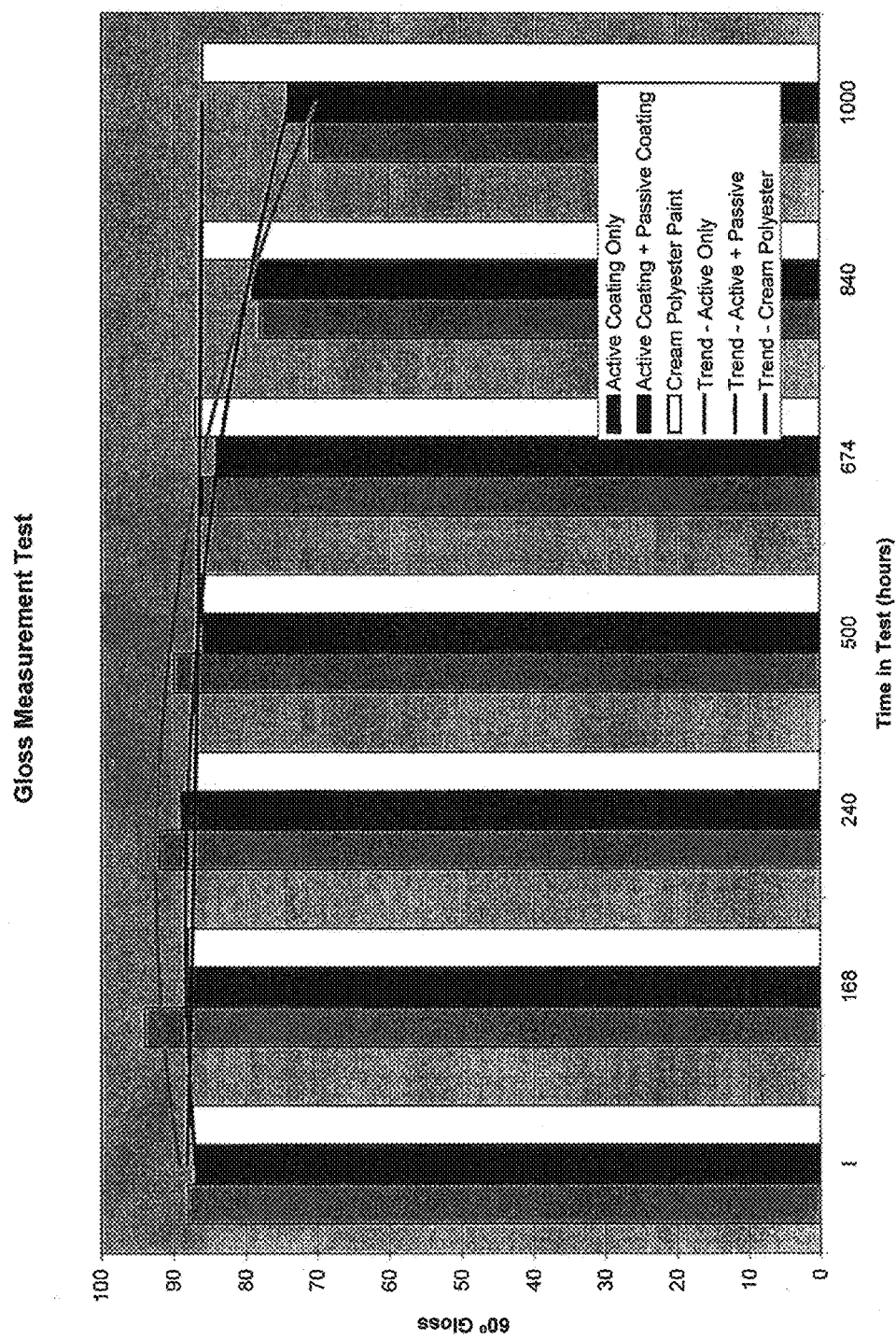

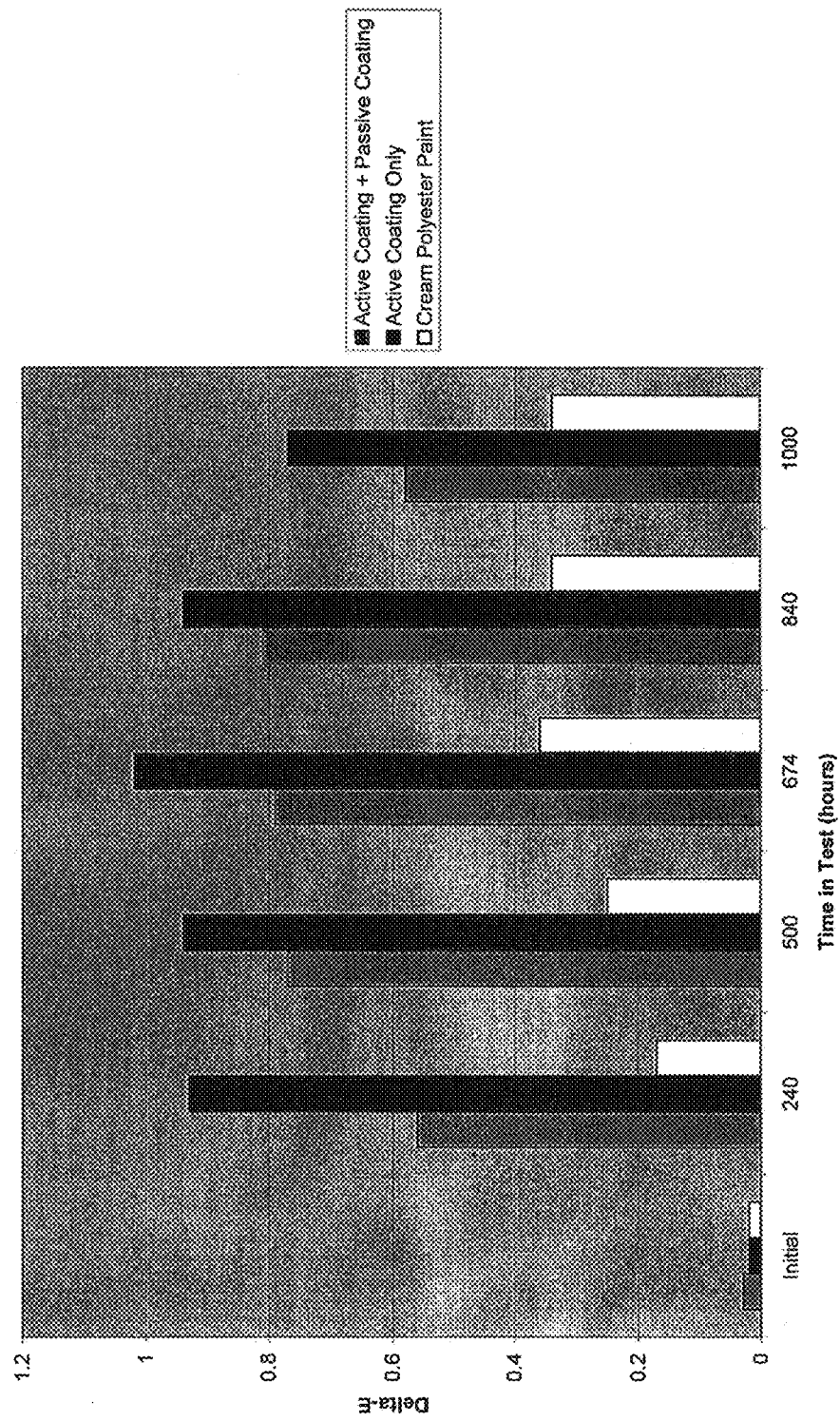

FIG. 11A

EXAMPLE 3 - ROLL COAT TRIAL RUN

LRB #: 767
COATING: PPG UC108219 (self cleaning clear)

Substrate:
6) ALCOA Arch. Prod. Coil # 2738907 .020" Pure White
7) ALCOA Arch. Prod. Coil # 2738911 .020" Pure White
8) ALCOA Arch. Prod. Coil # 2738910 .020" Pure White General Info.

Product side applicator roll is durometer, inch diameter; pick-up chrome inch diameter
Public side applicator roll is 55 durometer, inch diameter, 6 inch diameter, pick-up chrome 6 inch diameter

UC108219
84676

| Trial # | Line speed FPM | LV Oven temp. F | HV Oven temp. F | Roll Speed Applicator Product side FPM | Roll Speed App. / Pick-up Public side RPM FPM | Feed Bar Angle | Force LBs. feed bar Dr. / Op. | Feed Bar position dr / op | Force LBs. applicator Dr. / Op. | App. Roll position dr / op | Wet film Product side | Dry film Product side msi. | Dry film Public side msi. | PMT Fahr. | Substrate |
|---|---|---|---|---|---|---|---|---|---|---|---|---|---|---|---|
| T # 8 | 150 | 250 | 250 | 170 / 75 | N/A | | 60 / 65 | | | .0700 / .0700 | | | | | # 6 |
| 10 min. | 150 | 250 | 250 | 170 / 75 | N/A | | 60 / 65 | | | .0700 / .0700 | | | | < 210 | # 6 |
| T # 9 | 150 | 250 | 250 | 170 / 75 | N/A | | 60 / 65 | | | .0700 / .0700 | | | | | # 7 |
| 12 min. | 150 | 250 | 250 | 170 / 75 | N/A | | 60 / 65 | | | .0700 / .0700 | | | | < 210 | # 7 |
| T # 10 | 150 | 250 | 250 | 170 / 75 | N/A | | 60 / 65 | | | .0700 / .0700 | | | | | # 8 |
| 7 min. | 150 | 250 | 250 | 170 / 75 | N/A | | 60 / 65 | | | .0700 / .0700 | | | | < 210 | # 8 |
| T # 11 | 150 | 250 | 250 | 170 / 75 | N/A | | 60 / 65 | | | .0700 / .0700 | | | | | # 8 |

NOTE: Put in smooth chrome pick-up roll (T # 11)
Coating adjustment:
1) Product side, saved 6.5 gal. PPG UC108219 coating.

FIG. 11B

EXAMPLE 3 - ROLL COAT TRIAL RUN

LRB # 768
COATING: TOTO HydroTect clear coat waterbase Type A
General Info.

Substrate:
1) LRB 767 T # 3 coil # 2738916 Trans. White
2) LRB 767 T # 10 coil # 2738910 Pure white Product side applicator roll is durometer, inch diameter; pick-up chrome inch diameter
Public side applicator roll is 55 durometer, 6 inch diameter, pick-up chrome 6 inch diameter TOTO waterbase THPC39040WC-A

| Trial # | Line speed FPM | LV Oven temp. F | HV Oven temp. F | Roll Speed Applicator Product side FPM | Roll Speed App./Pick-up Public side RPM | FPM | Feed Bar Angle | Force LBs. feed bar Dr./Op. | Feed Bar position dr/op | Force LBs. applicator Dr./Op. | App. Roll position dr/op | Wet film Product side | Dry film Product side msi. | Dry film Public side msi. | PMT Fahr. | Substrate |
|---|---|---|---|---|---|---|---|---|---|---|---|---|---|---|---|---|
| T # 1 | 150 | 250 | 250 | N/A | 110/45 | 173/71 | | Nip pressure - tight | | | | | | | | # 1 |
| T # 2 | 150 | 250 | 250 | N/A | 110/45 | 173/71 | | Nip pressure - loose | | | | | | | | # 1 |
| T # 3 | 150 | 250 | 250 | N/A | 110/45 | 173/71 | | Nip pressure - medium | | | | | | | | # 1 |
| T # 4 2 min. | 150 150 | 250 250 | 250 250 | N/A N/A | 110/45 110/45 | 173/71 173/71 | | Nip pressure - tight | | | | | | | | # 1 # 1 |
| T # 5 2 min. | 150 150 | 250 250 | 250 250 | N/A N/A | 110/45 110/45 | 173/71 173/71 | | Nip pressure - tight | | | | | | | | # 2 # 2 |
| T # 6 | 150 | 250 | 250 | N/A | 110/45 | 173/71 | | Nip pressure - medium | | | | | | | | # 2 |

NOTE: severe foaming in pump bucket (foam overflow onto floor)

Coating adjustment:
1) TOTO HydroTect clear coat waterbase (Type A) 4 gal., with 50 mls. Waterborne photocatalyst clear (Type B)

FIG. 11C

EXAMPLE 3 - ROLL COAT TRIAL RUN

LRB #  769    Substrate:  1) LRB 767 T # 3 coil # 2738916 Trans. White
COATING:  KON Corp. TPX - 220TS                 2) LRB 767 T # 9 coil # 2738911 Pure white General Info.

Product side applicator roll is durometer, inch diameter, pick-up chrome inch diameter
Public side applicator roll is 55 durometer, 6 inch diameter; pick-up chrome 6 inch diameter

KON 98803

| Trial # | Line speed FPM | LV Oven temp. F | HV Oven temp. F | Roll Speed Applicator Product side FPM | Roll Speed App. / Pick-up Public side RPM        FPM | Feed Bar Angle | Force LBs. feed bar Dr. / Op. | Feed Bar position dr / op | Force LBs. applicator Dr. / Op. | App. Roll position dr / op | Wet film Product side | Dry film Product side msi. | Dry film Public side msi. | PMT Fahr. | Substrate |
|---|---|---|---|---|---|---|---|---|---|---|---|---|---|---|---|
| T # 1 | 150 | 250 | 250 | N/A | 110 / 45   173 / 71 | | Nip pressure - tight | | | | | | | | # 1 |
| T # 2 | 150 | 250 | 250 | N/A | 110 / 45   173 / 71 | | Nip pressure - loose | | | | | | | | # 1 |
| T # 3 | 150 | 250 | 250 | N/A | 110 / 45   173 / 71 | | | | | | | | | | # 1 |
| 2 min. | 150 | 250 | 250 | N/A | 110 / 45   173 / 71 | | Nip pressure - medium | | | | | | | | # 1 |
| T # 4 | 150 | 250 | 250 | N/A | 110 / 45   173 / 71 | | | | | | | | | | # 2 |
| 2 min. | 150 | 250 | 250 | N/A | 110 / 45   173 / 71 | | Nip pressure - medium | | | | | | | | # 2 |

Coating adjustment:
1) KON TPX - 220TS, 5 gal.

FIG. 11D

EXAMPLE 3 - ROLL COAT TRIAL RUN

LRB # 770
COATING: TOTO HydroTect clear coat solvent base

Substrate:
1) LRB 767 T # 9 coil # 2738911 Pure white
2) LRB 767 T # 2 coil # 2738922 Trans. White General Info.

Product side applicator roll is durometer, inch diameter; pick-up chrome inch diameter
Public side applicator roll is 55 durometer, 6 inch diameter; pick-up chrome 6 inch diameter TOTO solvent base
TPCA801

| Trial # | Line speed FPM | LV Oven temp. F | HV Oven temp. F | Roll Speed Applicator Product side FPM | Roll Speed App./ Pick-up Public side RPM FPM | Feed Bar Angle | Force LBs. feed bar Dr. / Op. | Feed Bar position dr / op | Force LBs. applicator Dr./ Op. | App. Roll position dr / op | Wet film Product side | Dry film Product side msi. | Dry film Public side msi. | PMT Fahr. | Substrate |
|---|---|---|---|---|---|---|---|---|---|---|---|---|---|---|---|
| T # 1 | 150 | 250 | OFF | N/A | 110 / 45   173 / 71 | | Nip pressure - medium | | | | | | | | # 1 |
| T # 2 | 150 | 250 | OFF | N/A | 110 / 45   173 / 71 | | Nip pressure - loose | | | | | | | | # 1 |
| T # 3 | 150 | 250 | OFF | N/A | 110 / 45   173 / 71 | | Nip pressure - tight | | | | | | | | # 1 |
| T # 4 2 min. | 150 | 250 | OFF | N/A | 110 / 45   173 / 71 | | Nip pressure - medium | | | | | | | | # 1 |
| | 150 | 250 | OFF | N/A | 110 / 45   173 / 71 | | | | | | | | | | # 1 |
| T # 5 | 150 | 250 | 250 | N/A | 110 / 45   173 / 71 | | Nip pressure - medium | | | | | | | | # 2 |
| T # 6 | 150 | 250 | 250 | N/A | 110 / 45   173 / 71 | | Nip pressure - loose | | | | | | | | # 2 |
| T # 7 | 150 | 250 | 250 | N/A | 110 / 45   173 / 71 | | Nip pressure - tight | | | | | | | | # 2 |

Coating adjustment:
1) TOTO HydroTect clear coat solvent base 4 gal.

FIG. 12

EXAMPLE 4 - ROLL COAT TRIAL RUN

LRB # 776
COATING: TOTO HydroTect clear coat waterbase Type-A

Substrate: 1) 5042-H2E72 .0082" A272 L # P33745-111
2) LRB 767 T # 8 - ALCOA Arch. Prod. Coil # 2738907 .020"

General Info.

Product side applicator roll is durometer, inch diameter; pick-up chrome inch diameter
Public side applicator roll is 55 durometer, 6 inch diameter, pick-up chrome 6 inch diameter

TOTO
THPC090402WC-A

| Trial # | Line speed FPM | LV Oven temp. F | HV Oven temp. F | Roll Speed Applicator Product side FPM | Roll Speed App. / Pick-up Public side RPM | Feed Bar Angle FPM | Force LBs. feed bar Dr. / Op. | Feed Bar position df / op | Force LBs. applicator Dr. / Op. | App. Roll position df / op | Wet film Product side | Dry film Product side msi. | Dry film Public side msi. | PMT Fahr. | Substrate |
|---|---|---|---|---|---|---|---|---|---|---|---|---|---|---|---|
| T # 1 | 150 | 250 | 250 | 170 / 75 | N/A | | | | | .0700 / .0700 | | | | | # 1 |
| T # 2 | 150 | 250 | 250 | 150 / 50 | N/A | | 25 / 25 | | | .0700 / .0700 | | | | | # 1 |
| T # 3 | 150 | 250 | 250 | 150 / 50 | N/A | | 35 / 35 | | | .0700 / .0700 | | | | | # 1 |
| T # 4 | 150 | 250 | 250 | 150 / 50 | N/A | | 35 / 35 | | | .0700 / .0700 | | | | | # 1 |
| T # 5 | 150 | 250 | 250 | 150 / 50 | N/A | | 30 / 35 | | | .0700 / .0700 | | | | | # 1 |
| NOTE - Trials 1 thru 5 run with ceramic applicator and rough pick-up rolls | | | | | | | | | | | | | | | |
| T # 6 | 150 | 250 | 250 | 170 / 75 | N/A | | 95 / 90 | | | .0700 / .0700 | | | | | # 2 |
| T # 7 | 150 | 250 | 250 | 150 / 80 | N/A | | 95 / 95 | | | .0700 / .0700 | | | | | # 2 |
| T # 8 | 150 | 250 | 250 | 150 / 80 | N/A | | 95 / 95 | | | .0700 / .0700 | | | | | # 2 |
| 2 min. | | | | 150 / 80 | N/A | | 95 / 95 | | | .0700 / .0700 | | | | | # 2 |
| NOTE - Trials 6 thru 8 run with urethane applicator and rough pick-up rolls | | | | | | | | | | | | | | | |

Coating adjustment:
1) Product side THPC090402WC-A, 4 gal. as rec'd (B/4 T # 1)
2) Added 20 mls. THPC090402WC-B Type-B (B/4 T # 3)
3) Added 20 mls. THPC090402WC-B Type-B (B/4 T # 5)
4) Product side THPC090402WC-A, 4 gal. as rec'd (B/4 T # 6)

Contact Angle Measurements   FIG. 13

PPG - hydrophilic, silica coating, Easy Clean; TOTO, Kon - superhydrophilic, titanium

| Sample ID | Contact Angle Theta | Surface Tension Dyne/cm Approximate | Sample ID | Contact Angle Theta | Surface Tension Dyne/cm Approximate |
|---|---|---|---|---|---|
| Polyester As Is | 38.1 | 59 | Polyester, PPG, thin Kon | 21.2 | 67.9 |
| Polyester, PPG | 19.4 | 68.3 - 68.8 | | | |
| | 19.4 | 68.3 - 68.8 | Polyester, PPG, thin Kon after 5 min UV | 20.4 | 67.9 |
| | 17.7 | 69 | | | |
| Kynar As Is | 52.5 | 48.1 | Polyester, PPG, oven 350F 1 min | 52.6 | 48.1 |
| Kynar, thin PPG | 36.4 | 60 | | | |
| Kynar, thicker PPG | 17.9 | 69 | Polyester, PPG, medium Kon | 13.2 | >70 |
| Kynar, PPG - different pickup roll | 44.4 | 55.4 | | | |
| Bare Al | 26 | 65.7 | Kynar, PPG, medium Kon | 13.2 | >70 |
| Bare Al, thin TiO2 | 16.1 | 70 | | | |
| Bare Al, medium TiO2 | 14.5 | >70 | Kynar, PPG, medium solvent Toto | 22 | 67.5 |
| Bare Al, thick TiO2 | 11.9 | >70 | Kynar, PPG, thick solvent Toto | 22-23 | ~67 |
| Polyester, PPG, thin Toto Water | 20.9 | 67.9 | Kynar, PPG, thin solvent Toto | 22-23 | ~67 |
| Polyester, PPG, medium Toto Water | 15.1 | >70 | Polyester, PPG, medium solvent Toto | 27.4 | 65.2 |
| Polyester, PPG, thick Toto Water | 7.3 | >70 | Polyester, PPG, thick solvent Toto | 41.5 | 56.7 |
| Kynar, PPG, medium Toto Water | 14.4 | >70 | Polyester, PPG, thick solvent Toto | 37.1 | 59.5 |
| | | | Polyester, PPG, thin solvent Toto Drive side | 24 | 66.5 |
| Polyester, PPG, medium Kon | 14.7 | >70 | Polyester, PPG, thin solvent Toto operator side | 35.3 | 61.2 |
| | 12.6 | >70 | | | |

SELF-CLEANING SUBSTRATES AND METHODS FOR MAKING THE SAME

CROSS-REFERENCE TO RELATED APPLICATION

This patent application is a continuation of U.S. patent application Ser. No. 12/569,679, filed Sep. 29, 2009, and claims priority to U.S. Provisional Patent Application No. 61/230,953, filed Aug. 3, 2009, both entitled "SELF-CLEANING SUBSTRATES AND METHODS FOR MAKING THE SAME", which are both incorporated herein by reference in their entirety.

BACKGROUND

Titanium dioxide ($TiO_2$) may facilitate photocatalysis in the right environmental conditions. However, applying coatings containing $TiO_2$ to substrates, such as for architectural products, without detrimentally affecting the aesthetic features of such substrates has proven difficult and cost ineffective.

SUMMARY OF THE DISCLOSURE

The present disclosure relates to methods of producing colored, self-cleaning substrates by roll coating. Roll coating, also known as coil coating, is a high-speed process for applying coatings on substrates. These new colored, self-cleaning substrates retain the intend color and/or intended gloss of the initial substrate, thereby making them suitable for architectural and other applications. The colored, self-cleaning substrate may also be iridescent-free.

"Roll coating", sometimes called coil coating, and the like means an industrial process for rapidly (e.g., at least 10 feet per minute, such as in the range of 50-800 fpm) applying a coating to a substrate using rolls which contact the surface of the substrate. Roll coating includes direct roll coating, reverse roll coating and the like. Roll coating usually involves the use of two or more of (i) a back-up roll, (ii) an application or coating roll, and (iii) a pick-up/metering roll, where the coating material is measured onto the applicator roller by a precision setting of the gap between the metering roller and the application roller, as described in further detail below.

In one aspect, a method includes producing a colored sheet product (e.g., steel or aluminum) having a predetermined color by roll coating the sheet product. This roll coating step generally involves applying a colored coating to the sheet product. A colored coating is a coating (generally in the form of a liquid or colloid) that is adapted to produce a colored layer having a predetermined color and/or predetermined gloss. In one embodiment, a colored coating is a commercially available product, such as latex-based paints, oil-based paints, silicon-based coatings, and polymeric coatings, among others.

A predetermined color means a color that is picked in advanced, such as intended color of the end-use product. In some embodiments, the predetermined color is different than that of the natural color of the substrate. In some embodiments, the predetermined color is achieved by application of a colored coating, such as a paint of a predetermined color.

In some embodiments, the colored sheet product has a predetermined gloss. A predetermined gloss is a gloss that is picked in advanced, such as an intended gloss of the end-use product. In some embodiments, the predetermined gloss is different than that of the natural gloss of the substrate. In some embodiments, the predetermined gloss is achieved by application of a colored coating, such as a paint of a predetermined gloss.

In one embodiment, the sheet product is an aluminum alloy sheet product. An aluminum alloy sheet means an aluminum sheet or foil product produced from an aluminum alloy. An aluminum sheet product generally has dimensions in the range of 0.006 inch to 0.249 inch (or sometimes up to 0.5 or 0.75 inch). An aluminum foil product generally has dimensions of less than 0.006 inch.

The producing a colored sheet product step may include converting the colored coating into a colored layer, where the colored layer is located on an outer surface of the sheet product. In some embodiments, the colored layer covers substantially all of a first side of the sheet product.

"Converting a colored coating into a colored layer" and the like means to change the colored coating, which is generally in liquid form, into a colored layer, which is generally in solid form. The converting may be accomplished, for example, via one or more of a change in temperature (e.g., due to radiation, convection, conduction) and/or time, which may result in evaporation of solvents and/or chemical reactions, to name a few. The converting may be accomplished concomitant to the application of a coating to the substrate.

"Colored layer" means a layer produced from a colored coating, and which may have a predetermined color and/or a predetermined gloss. For example, an aluminum alloy sheet material may have a colored layer having a predetermined color and/or a predetermined gloss, which may be useful in architectural and other building applications, among others. In one embodiment, a colored layer includes organic constituents, which may degrade if exposed to photocatalytic processes. In one embodiment, a colored layer predominately includes carbon-based or polymeric-based materials. In one embodiment, a colored layer is liquid impermeable (e.g., water impermeable) and may protect an underlying base (e.g., an aluminum alloy sheet) from communication with liquid or other materials that may permeate and/or contact a surface of the base. In one embodiment, the thickness of the colored layer is at least about 7 microns. In other embodiments, the thickness of the colored layer is at least about 10 microns, or at least about 20 microns. In one embodiment, the thickness of the colored layer is not greater than 150 microns. In other embodiments, the thickness of the colored layer is not greater than about 100 microns, or not greater than about 75 microns, or not greater than about 50 microns, or not greater than about 45 microns, or not greater than about 40 microns. In one embodiment, the colored layer has a thickness in the range of 20 to 37 microns.

Concomitant to the production of this first colored sheet product, or thereafter, an intermediate sheet product may be produced by roll coating a barrier coating onto a at least a portion of the colored layer of the first colored sheet product to produce a barrier layer on at least a portion of the colored layer. The roll coating process may including applying a barrier coating to surfaces of the colored layer and converting the barrier coating into a barrier layer. After the converting step, the barrier layer is located on at least a portion of the colored layer. In one embodiment, the barrier layer substantially covers the colored layer.

A barrier coating is a coating (generally in the form of a liquid or colloid) adapted to produce a barrier layer. In one embodiment, a barrier coating is a silica containing coating, such as EASY CLEAN, produced by PPG Industries, Pittsburgh, Pa.

"Barrier layer" and the like means a layer configured to act as a barrier to a colored layer. In one embodiment, a barrier layer may act as a barrier between a colored layer and a self-cleaning layer, thereby preventing degradation of organic constituents of the colored layer. In one embodiment, the barrier layer has a hydrophilicity that is coincidental to that of a self-cleaning layer, and thus facilitates coupling of the self-cleaning layer to the substrate. In one embodiment, a substrate having a barrier layer and/or a self-cleaning layer is capable of passing the Scotch 610 tape pull test, as defined by ASTM D3359-02, Aug. 10, 2002. In one embodiment, the barrier layer has a thickness of at least about 1000 Angstroms (0.1 microns). In other embodiments, the barrier layer has a thickness of at least about 0.15 micron, or at least about 0.2 micron. In one embodiment, the barrier layer has a thickness of not greater than about 1 micron. In other embodiments, the barrier layer has a thickness of not greater than about 0.75 micron, or not greater than about 0.50 micron, or not greater than about 0.4 micron. In one embodiment, the barrier layer has a thickness in the range of 0.2 to 0.3 micron.

"Converting a barrier coating into a barrier layer" and the like means to change the barrier coating, which is generally in liquid form, into a barrier layer, which is generally in solid form. The converting may be accomplished, for example, via one or more of a change in temperature (e.g., due to radiation, convection, conduction) and/or time, which may result in evaporation of solvents and/or chemical reactions, to name a few. The converting may be accomplished concomitant to the application of a coating to the substrate.

After this converting step, the intermediate sheet product retains the predetermined color and/or retains the predetermined gloss of the colored sheet product. This may be due to the use of silica based barrier coatings and/or due to the agitation of such barrier coatings during the application of the barrier coating to the sheet. The barrier layer is generally transparent.

"Retains the predetermined color" means that the difference in color between (1) the color of a substrate having only the colored layer and (ii) the color of a substrate having the colored layer and at least one additional layer (e.g., a barrier layer, a self-cleaning layer), is not greater than about 10 Delta E. In some embodiments, the color difference is not greater than about 9 Delta-E, or not greater than about 8 Delta-E, or not greater than about 7 Delta-E, or not greater than about 6 Delta-E, or not greater than about 5 Delta-E, or not greater than about 4 Delta-F, or not greater than about 3 Delta-E, or not greater than about 2 Delta-h, or not greater than about 1 Delta-E.

"Retains the predetermined gloss" means that the difference in gloss between (i) the gloss of a substrate having only the colored layer and (ii) the gloss of a substrate having the colored layer and at least one additional layer (e.g., a barrier layer, a photocatalytic layer), is not greater than about 20 units (e.g., % gloss units) as measured in accordance with ASTM D 523. In some embodiments, the gloss difference is not more than about 15 units or not more than about 13 units or not more than about 10 units or not more than about 9 units or not more than about 8 units or not more than about 7 units or not more than about 6 units or not more than about 5 units or not more than about 4 units or not more than about 3 units or not more than about 2 units or not more than about 1 unit. One instrument for measuring gloss is a BYK-GARDNER AG-4430 micro-TRI-gloss glossmeter.

Concomitant to the production of this intermediate colored sheet product, or thereafter, a self-cleaning sheet product may be produced by roll coating a self-cleaning coating onto a at least a portion of the barrier layer of the intermediate colored sheet product to produce a self-cleaning layer on at least a portion of the barrier layer. The roll coating process may including applying a self-cleaning coating to surfaces of the barrier layer and converting the self-cleaning coating into a self-cleaning layer. After the converting step, the self-cleaning layer is located on at least a portion of the barrier layer. In one embodiment, the self-cleaning layer substantially covers the barrier layer.

"Self-cleaning coating" means a coating (generally in the form of a liquid or colloid) that is adapted to produce a self-cleaning layer. In one embodiment, the self-cleaning coating is a titanium dioxide containing coating in the form of sol), such as the HYDROTECT products of TOTO (Tokyo, Japan) and/or the SAGAN products of the KON Corporation (Takeo-city, Japan). In some embodiments, the self-cleaning coating is surfactant-free.

"Converting a self-cleaning coating into a self-cleaning layer" and the like means to change the self-cleaning coating, which is generally in liquid form, into a self-cleaning layer, which is generally in solid form. The converting may be accomplished, for example, via one or more of a change in temperature (e.g., due to radiation, convection, conduction) and/or time, which may result in evaporation of solvents and/or chemical reactions, to name a few. The converting may be accomplished concomitant to the application of a coating to the substrate.

"Self-cleaning layer" and the like means a layer that has a high surface tension surface and/or uses photocatalysis to facilitate cleaning of the substrate. In one embodiment, the self-cleaning layer is a titanium dioxide layer. A titanium dioxide layer is a coating containing titanium dioxide particles with particle sizes in the 10-50 nm range (generally). In one embodiment, a self-cleaning coating may actively break down materials that come in contact with its surfaces, such as dirt, grime, oil, dust, and/or mold, to name a few, ("visual detractants") by utilizing sunlight, fluorescent light, blacklight or any other light source at wavelengths above about 300 nm, to photocatalytically break down the visual detractants. The visual detractants may then be removed from the surface via water (e.g., rain water). In other words, visual detractants may decompose to simple organic or inorganic compounds, which re-enter the atmosphere and/or wash away under the effects of ambient conditions (e.g., heat, wind and/or rain), thus making the layer self-cleaning. Use of self-cleaning layers may provide an easier way to maintain visually appealing surfaces, and an easier way to clean substrates, and in the absence of detergents, which may be harmful to the environment, and in the absence of a dedicated water spray, which may waste water.

In one embodiment, the self-cleaning layer has a thickness of at least about 1000 Angstroms (0.1 microns). In other embodiments, the self-cleaning layer has a thickness of at least about 0.15 micron, or at least about 0.2 micron. In one embodiment, the self-cleaning layer has a thickness of not greater than about 1 micron. In other embodiments, the self-cleaning layer has a thickness of not greater than about 0.75 micron, or not greater than about 0.50 micron, or not greater than about 0.4 micron. In one embodiment, the self-cleaning layer has a thickness in the range of 0.2 to 0.3 micron.

After this converting step, the self-cleaning sheet product retains the predetermined color and/or retains the predetermined gloss of the colored. Sheet product. This may be due to the use of self-cleaning coatings containing little or no surfactants and/or the use of surfactants having low-foaming capabilities. The self-cleaning layer is generally transparent.

In one embodiment, the self-cleaning sheet product achieves a high wettability rating. A high wettability rating indicates that the self-cleaning layer of the product is substantially uniform across the width of the sheet product. In one embodiment, a substrate 1 containing a self-cleaning layer 30 achieves a uniformity rating of at least H, as measured in accordance with the below described wettability test. In other embodiments, a substrate 1 containing a self-cleaning layer 30 achieves a uniformity rating of at least G, or a uniformity rating of at least F, or a uniformity rating of at least E, or a uniformity rating of at least D, or a uniformity rating of at least C, or a uniformity rating of at least B, or a uniformity rating of A.

These steps of roll coating the colored coating, the barrier coating and the self-cleaning coating may be accomplished in series and via, the use of a series of roll coating apparatus, and within a short period of time from one to the other. This embodiment may be useful for turning raw sheet product into a colored, self-cleaning sheet product at a single location. In other embodiments, the colored sheet product is produced at one location, and then. Shipped to another location for application of the barrier coating and/or the self-cleaning coating.

Various ones of the above-described aspects, approaches and embodiments may be combined to produce various colored, self-cleaning substrates.

BRIEF DESCRIPTION OF THE DRAWINGS

FIG. 7 is a flow chart illustrating various batch methods of producing self-cleaning substrates.

FIG. 9a is a graph illustrating the change in gloss from a colored substrate to substrates having barrier layers and/or self-cleaning layers.

FIG. 9b is a graph illustrating the change in color from a colored substrate to substrates having barrier layers and/or self-cleaning layers.

FIG. 11a is a chart illustrating test conditions for Example 3, sample LRB 767.

FIG. 11b is a chart illustrating test conditions for Example 3, sample LRB 768.

FIG. 11c is a chart illustrating test conditions for Example 3, sample LRB 769.

FIG. 11d is a chart illustrating test conditions for Example 3, sample LRB 770.

FIG. 12 is a chart illustrating test conditions for Example 4, sample LRB 776.

FIG. 13 is a chart illustrating the surface tension of various example substrates.

DETAILED DESCRIPTION

Broadly, the present disclosure relates to substrates that realize a combination of one or more of: (i) self-cleaning properties, (ii) a visual appearance that meets consumer acceptance standards, and (iii) a cost effective production methodology. In one embodiment, a substrate achieves at least two of these criteria. In one embodiment, a substrate achieves at least three of these criteria.

Figure 1:
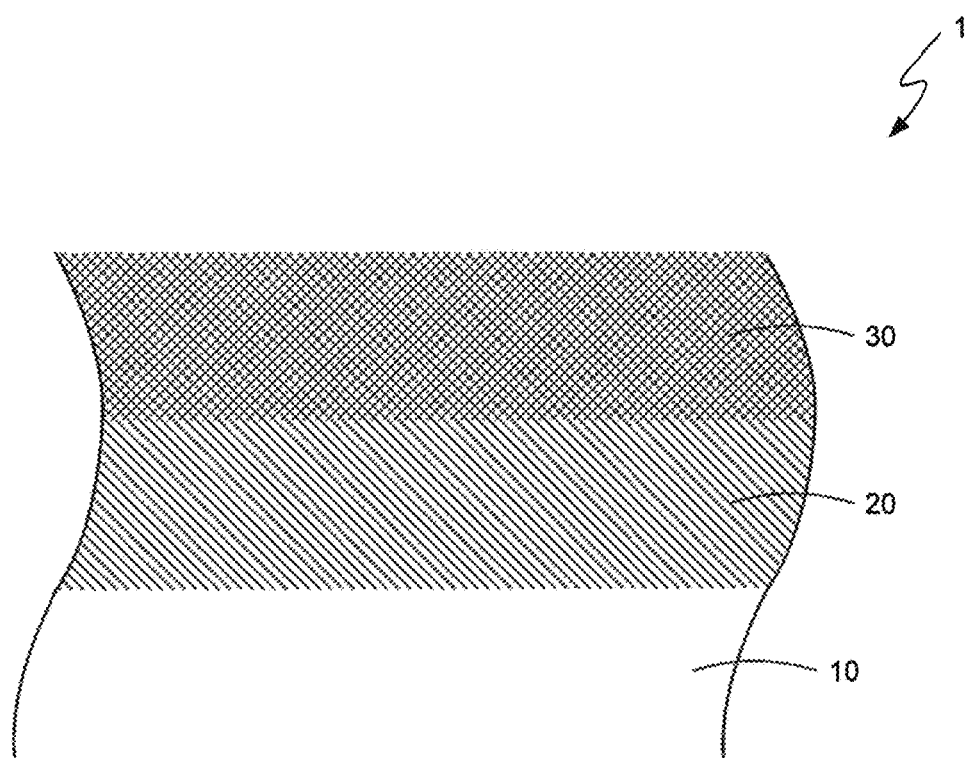
FIG. 1 is a schematic, side-view of an embodiment of a portion of a self-cleaning substrate.

In one aspect, and with reference now to FIG. 1, a substrate 1 includes a base 10, an organic layer 20, and a self-cleaning coating layer 30. The base 10 may be an aluminum alloy base, as described in further detail below. The organic layer 20 may be a painted layer, as described in further detail below. The organic layer 20 may have a tailored color and gloss, among others visual characteristics. The self-cleaning coating layer 30 is a generally transparent layer that facilitates self-cleaning while achieving a visual appearance that meets consumer acceptance standards. For example, the self-cleaning coating layer 30 may facilitate retention of the gloss and color of the material underlying the self-cleaning coating layer, such as the organic layer 20, while also being iridescent free.

Visual Appearance

In one embodiment, the self-cleaning coating layer 30 retains the gloss of the material underlying the self-cleaning coating layer 30, such as the gloss of the organic layer 20. For example, the gloss of the substrate may remain relatively unchanged after application of the self-cleaning coating layer 30. In one embodiment, the gloss of a substrate having the self-cleaning coating layer 30 may change by not greater than about 20 units (% gloss units) relative to the gloss of the material underlying the self-cleaning coating layer 30. In other embodiments, the gloss of a substrate having a self-cleaning coating layer 30 changes by not more than about 15 units, or by not more than about 13 units, or by not more than about 10 units, or by not more than about 9 units, or by not more than about 8 units, or by not more than about 7 units, or by not more than about 6 units, or by not more than about 5 units, or by not more than about 4 units, or by not more than about 3 units, or by not more than about 2 units, or by not more than about 1 unit relative to the gloss of the material underlying the self-cleaning coating layer 30.

Gloss may be measured in accordance with ASTM D 523. One instrument for measuring gloss is a BYK-GARDNER AG-4430 micro-TRI-gloss glossmeter, which is capable of measuring gloss as 20°, 60° and 85°. In one embodiment, a glossmeter measures gloss at one of 20°, 60° and 85°, and the substrate containing the self-cleaning coating layer 30 retains the gloss of the underlying material at this one angle. In one embodiment, a glossmeter measures gloss at two of 20°, 60° and 85°, and the substrate containing the self-cleaning coating layer 30 retains the gloss of the underlying material at these two angles. In one embodiment, a glossmeter measures gloss at all three of 20°, 60° and 85°, and the substrate containing the self-cleaning coating layer 30 retains the gloss of the underlying material at all three angles.

In one embodiment, the self-cleaning coating layer 30 retains the color of the material underlying the self-cleaning coating layer 30. For example, the color of the substrate may remain relatively unchanged after application of the self-cleaning coating layer 30. In one embodiment, the color of a substrate having a self-cleaning coating layer 30 may change by not greater than about 10 Delta-E relative to the color of the material underlying the self-cleaning coating layer 30. In other embodiments, the color of a substrate may change by not greater than about 9 Delta-E, or not greater than about 8 Delta-E, or not greater than about 7 Delta-E, or not greater than about 6 Delta-E, or not greater than about 5 Delta-E, or not greater than about 4 Delta-E, or not greater than about 3 Delta-E, or not greater than about 2 Delta-E, or not greater than about 1 Delta-E.

As known to those skilled in the art, Delta-E is a number that represents the distance between two colors. Delta-E may be measured using LCH, LAB and other color parameters, and via a consistent illumination source (e.g., white light of a defined wavelength and wattage output) at a consistent, specified distance between the light and the substrate, and via one of the various Delta-E equations. In one embodiment, the Delta-E equation is based on dE76. In one embodiment, the Delta-E equation is based on dE94. In one embodiment, the Delta-E equation is based on dE-CMC. In one embodiment, the Delta-E equation is based on dE-CMC 2:1. In one embodiment, the Delta-E equation is based on dE2000. The parameters surrounding these Delta-E equations are known to those skilled in the art, and are described, for example, in:

(1) "*Historical development of CIE recommended color difference equations*", by A. R. Robertson, Laboratory for Basic Standards National Research Council of Canada Ottawa, Ontario, Canada K1A OR6, Paper presented at the ISCC Conference on Color Discrimination Psychophysics, Williamsburg, Va., 1989, published in Color Research & Application, Vol. 15, Issue 3, Pages 167-170, published online 2007 by Wiley Periodicals, Inc., A Wiley Company; and (2) "*The development of the CIE 2000 colour-difference formula: CIEDE2000*", by M. R. Luo et al. of the Colour & Imaging Institute, University of Derby, UK, in Color Research and Application, Vol. 26, Issue 5, pp. 340-350, published online 2001 by Wiley Periodicals, Inc., A Wiley Company.

Each of these publications are incorporated herein by reference in their entirety.

Delta-E may be measured using a consistent illumination source, located at a specified distance from the substrate, and a spectrophotometer (e.g., from Hunterlab, a.k.a., Hunter Associates Laboratory, Inc., 11491 Sunset Hills Road, Reston, Va. 20190-5280). To determine the color difference at two different viewing angles, the color values may be measured by the spectrophotometer at the first angle, and a second angle, and Delta-E determined. The second angle is generally at least 15 degrees different than the second angle, but is generally not more than 165 degrees different than the first angle. In one embodiment, Delta-E is measured in accordance with ASTM 2244. In one embodiment, Delta-E is measured using a GRETAG MACBETH COLOR-EYE 2246, or equivalent instrumentation.

The self-cleaning coating layer 30 may be iridescent free. In one embodiment, a substrate 1 containing a self-cleaning coating layer 30 is iridescent free, as determined via visual inspection. In one embodiment, the visual inspection is completed via the human eye, with a vision of 20/20, and at an appropriate distance to detect iridescence in the substrate.

Uniformity, Thickness and Durability

To facilitate one or more of these visual appearance properties, the self-cleaning coating layer 30 may be relatively uniform. In one embodiment, a substrate 1 containing a self-cleaning coating layer 30 achieves a uniformity rating of at least H, as measured in accordance with the below described wettability test. In other embodiments, a substrate 1 containing a self-cleaning coating layer 30 achieves a uniformity rating of at least G, or a uniformity rating of at least F, or a uniformity rating of at least E, or a uniformity rating of at least D, or a uniformity rating of at least C, or a uniformity rating of at least B, or a uniformity rating of A, as measured in accordance with the below described wettability test.

To facilitate one or more of these visual appearance properties, the self-cleaning coating layer 30 may be relatively thin. In one embodiment, the self-cleaning coating layer 30 has a thickness of not greater than about 1 micron. In other embodiment, the self-cleaning coating layer 30 has a thickness of not greater than about 0.9, or not greater than about 0.8 micron, or not greater than about 0.7 micron, or not greater than about 0.6 micron, or not greater than about 0.5 micron, or not greater than about 0.4 micron, or not greater than about 0.3 micron, or not greater than about 0.2 micron. The thickness of the self-cleaning coating layer 30 should be sufficiently large to facilitate self-cleaning properties. In one embodiment, the thickness of the self-cleaning coating layer is at least about 0.05 microns.

The self-cleaning coating layer 30 may be durable. In one embodiment, a substrate 1 containing a self-cleaning coating layer 30 is abrasion/scratch-resistant (e.g., as measured after normal densification). In one embodiment, a substrate containing a self-cleaning coating layer 30 is able to consistently pass a pencil hardness test as defined by ASTM D3363-05. In these pencil hardness tests, the substrate 1 may consistently pass/achieve a 5H or 6H rating, or higher. In one embodiment, the self-cleaning layer is adherent. Adherent to means that a surface is capable of passing the Scotch 610 tape pull test, as defined by ASTM D3359-02, Aug. 10, 2002.

Self-Cleaning Properties

Passive Self-Cleaning

The self-cleaning coating layer 30 facilitates self-cleaning properties. In one embodiment, the self-cleaning coating layer 30 is a passive self-cleaning layer. A passive self-cleaning layer is one that does not utilize photocatalysis to facilitate cleaning of the substrate. A passive self-cleaning layer generally is moderately hydrophilic and achieves a water contact angle of not greater than about 40°. In one embodiment, a passive self-cleaning coating layer achieves a water contact angle of not greater than about 37°. In other embodiments, a passive self-cleaning coating layer achieves a water contact angle of not greater than about 35°, or a water contact angle of not greater than about 30°, or a water contact angle of not greater than about 25°, or a water contact angle of not greater than about 20°, or a water contact angle of not greater than about 15°. Those skilled in the art can convert these contact angle measurements to a surface tension value. For example, a contact angle below about 15 degrees equates to a surface tension of ≥about 70 dyne/cm. For a contact angle of about 20 degrees the surface tension is about 68 dyne/cm. For a contact angle of about 38 degrees the surface tension is about 59 dyne/cm.

The passive self-cleaning coating layer may facilitate self-cleaning properties via reduction of surface tension, as evidenced by the above low wetting contact angles. As a result, many contaminants (e.g., organic contaminants) will not readily adhere to the surface of passive self-cleaning coating layer. Furthermore, when water is applied (e.g., via rain or washing), contaminants are readily removed via the water.

A passive self-cleaning coating later generally includes materials that facilitate the above-described visual appearance, uniformity, thickness, and/or durability properties while facilitating the reduction of surface tension of the substrate. One passive self-cleaning coating layer includes silica ($SiO_2$), such as when applied via an aqueous solution comprising silica. In one embodiment, the silica is applied via a roll coating or a spraying process, as described in further detail below. In one embodiment, a passive silica coating is achieved via application of EASY CLEAN by PPG Industries, Pittsburgh, Pa.

Active Self-Cleaning

In one embodiment, the self-cleaning coating layer 30 is an active self-cleaning layer. An active self-cleaning layer is one that utilizes photocatalysis to facilitate cleaning of the substrate. An active self-cleaning layer generally is very hydrophilic and achieves a water contact angle of not greater than about 25°. In one embodiment, an active self-cleaning coating layer achieves a water contact angle of not greater than about 22°. In other embodiments, an active self-cleaning coating layer achieves a water contact angle of not greater than about 20°, or a water contact angle of not greater than about 18°, or a water contact angle of not greater than about 15°, or a water contact angle of not greater than about 12°, or a water contact angle of not greater than about 10°, or a water contact angle of not greater than about 8°, or a water contact angle of not greater than about 7°.

Like the passive self-cleaning coating layer, an active self-cleaning coating layer may facilitate self-cleaning properties via reduction of surface tension, as evidenced by the above low wetting contact angles. As a result, many contaminants (e.g., organic contaminants) will not readily adhere to the surface of passive self-cleaning coating layer. Furthermore, when water is applied (e.g., via rain or washing), contaminants are readily removed with the water.

Additionally, an active self-cleaning coating layer may facilitate cleaning via photocatalysis. In this embodiment, the self-cleaning substrates may actively break down materials that come in contact with surfaces of the substrate, such as dirt, grime, oil, dust, and/or mold, to name a few, ("visual detractants") by utilizing sunlight, fluorescent light, blacklight or any other light source at wavelengths above about 300 nm, to photocatalytically break down the visual detractants. The visual detractants may then be removed from the surface via water (e.g., rain water). In other words, visual detractants may decompose to simple organic or inorganic compounds, which re-enter the atmosphere and/or wash away under the effects of ambient conditions (e.g., heat, wind and/or rain), thus making the substrates self-cleaning. Use of self-cleaning substrates provides an easier way to maintain visually appealing surfaces, and an easier way to clean substrates, and in the absence of detergents, which may be harmful to the environment, and in the absence of a dedicated water spray, which may waste water.

Photocatalysis means the use of light to excite a catalyst on a surface to release energy. The catalyst is not consumed by this reaction. The energy released from the catalyst is used to start a reaction, or reaction sequence. Semiconductors can have photocatalytic properties.

Semiconductors are any of various solid crystalline substances, such as germanium, titanium, indium or silicon, or the oxides of these crystalline substances, having electrical conductivity greater than insulators. Semiconductors are distinguished from insulators by a band gap energy. Band gap energy is the energy that electrons must have to move from a valence band to a conduction band. There is an arbitrary band energy assigned of 4.0 electron volts (ev) to separate semiconductors from insulators. Semiconductors have a band gap of less than or equal to 4.0 electron volts. Titanium dioxide in the anatase crystalline form has a band gap of 3.2 ev.

In one embodiment, the active self-cleaning coating layer is a titanium dioxide layer. A titanium dioxide layer is a coating containing titanium dioxide particles with particle sizes in the 10-50 nm range (generally). The coating may also contain clay, mineral, alkali and/or other semiconductor(s).

The photocatalytically active self-cleaning coating layer may include a plurality of a photocatalytically active semiconductor fine particles. The particles may be uniformly dispersed within the layer (sometimes referred to herein as film) or may be non-uniformly dispersed in the film. The particles are located in the film so that at least a portion of the fine particles are partially exposed to the environment through the surface of the film so as to facilitate self-cleaning functionality. In one embodiment, titanium dioxide is used as the photocatalytically active semiconductor. Suitable types of photocatalytically active $TiO_2$ semiconductors that may be used include, but are not limited to, anatase, rutile and brookite crystalline forms of titanium dioxide and or combinations thereof. In one embodiment, the photocatalytically active film is an anatase titanium dioxide layer, where the titanium dioxide particles are in a size range of about 10 to about 50 nm. In one embodiment, the photocatalytically active film is produced from TOTO THPC090402WC-A, which is an aqueous based liquid containing about 0.5-10 wt. % silica, 85-95 wt. % water, and 0.2-5 wt. % titanium dioxide. In this embodiment, TiO2 is the active material and silica is the film former. In one embodiment, a surfactant, such as an organic liquid (e.g., poly(oxy-1,2-ethanediyl), alphamethylomega-[3-[1,3,3,3-tetramethyl-1-[(trimethylsilyl)oxy]-1-disiloxanyl] propoxy]-) is used with the aqueous based liquid.

It is believed that the mechanism of the photocatalytically active semiconductor works as follows: once the photocatalytically active semiconductor, for example $TiO_2$, is illuminated by ultraviolet light with a wavelength above about 300 nm, electrons in the valence band are excited to the conduction band. When the electrons return to their lower energy state, energy is emitted and interacts with water vapor or oxygen molecules to form hydroxyl radicals and super oxide anions, respectively. Both the hydroxyl radicals and superoxide anions are strong oxidizing species, which can react and breakdown organic pollutants into simpler, lower molecular weight, oxidized products.

Barrier Layer

Figure 2:
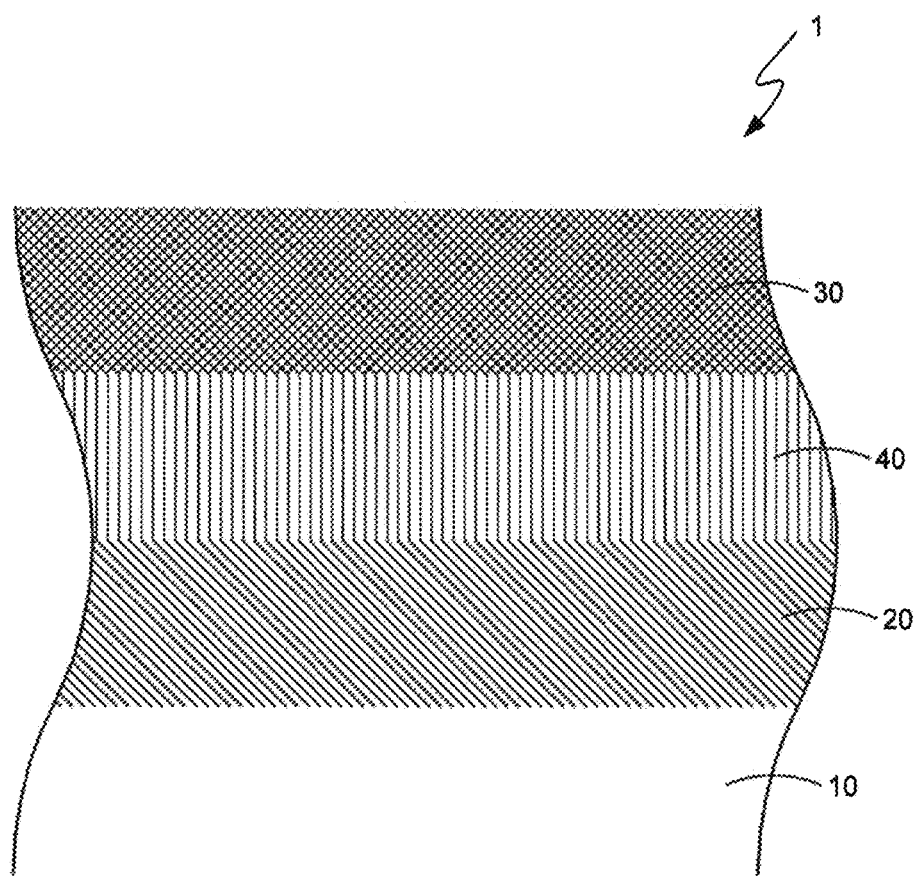
FIG. 2 is a schematic, side-view of an embodiment of a portion of a self-cleaning substrate.

In one embodiment, and with reference now to FIG. 2, a self-cleaning coating layer 30 may be coupled to a second layer (e.g., non-organic), or a barrier layer. For example, an active self-cleaning coating layer 30 may detrimentally interact with an organic layer 20, such as painted layer, due to, for example, the catalytic properties of the active self-cleaning coating layer. In these instances, a barrier layer 40 may be used, which may act as a barrier between the organic layer 20 and the active self-coating cleaning layer 30. In the illustrated embodiment, the barrier layer 40 is a passive self-cleaning coating layer (e.g., a coating containing silica). In this embodiment, the combination of these two layers 30, 40 may still achieve the above-described visual appearance, uniformity, thickness, and/or durability properties while facilitating the reduction of surface tension and/or active self cleaning properties of the substrate. In these embodiments, the barrier layer 40 should be sufficiently thick so as to facilitate adhesion of the self-cleaning coating layer 30 to the barrier layer, but should be sufficiently thin to still achieve the above-described visual appearance standards. For example, the barrier layer 40 may have similar thickness and uniformity to those described above with respect to the self-cleaning layer of FIG. 1. Likewise, the self-cleaning coating layer 30 should be sufficiently thick so as to (i) facilitate adhesion to the barrier layer 40, (ii) durability of the substrate 1, and, in some instances, (iii) sufficient surface area and mass transport capabilities to facilitate photocatalysis, but should be sufficiently thin to still achieve the above-described visual appearance standards. For example, the self-cleaning coating layer 30 may have similar thickness and uniformity to those described above with respect to the self-cleaning layer of FIG. 1

Coupled to means joined to another surface. For example, a photocatalytically active film or layer may be at least partially coupled to a barrier layer via the physical interaction between the materials of those two layers. In one embodiment, a first material may be coupled to a second material, and the first material may also be adherent to the second material. Adherent to means that a surface is capable of passing the Scotch 610 tape pull test, as defined by ASTM D3359-02, Aug. 10, 2002.

$CO_2$ Removal

In one embodiment, a self-cleaning coating layer 40 is configured to also remove carbon dioxide from surrounding gases. Methods for configuring coatings (e.g., coatings containing photocatalytically active substances) to remove carbon dioxide, and systems and compositions relating to the same, are described in commonly-owned U.S. patent application Ser. No. 11/828,305, entitled "SURFACES AND COATINGS FOR THE REMOVAL OF CARBON DIOXIDE", filed Jul. 25, 2007, which is incorporated herein by reference in its entirety.

Base Material

The base material 10 may be any material that can have self-cleaning coatings. In one embodiment, the base material 10 is aluminum or an aluminum alloy, such as any of the aluminum association series 1xxx, 2xxx, 3xxx, 4xxx, 5xxx, 6xxx, 7xxx, 8xxx or 9xxx aluminum alloys. As described below, aluminum-containing base materials 10 having an organic layer 20 are particularly difficult to produce via high production rate systems (e.g., via roll coating) due to the thermal limitations imposed on the processing of aluminum and/or the organic material coupled thereto. The base material 10 may be a wrought aluminum product or a cast aluminum product. In one embodiment, the wrought aluminum product is a sheet, foil or plate product. In one embodiment, the rolled product has a thickness of at least about 0.1 mm. In one embodiment, the wrought aluminum product is an extrusion. In one embodiment, the wrought aluminum product is a forging. In one embodiment, the base material 10 is an aluminum alloy suited for use in any of the commercial applications noted below. In one embodiment, the base material 10 is brushed aluminum. In one embodiment, the base material 10 is a composite aluminum product, such as a laminate aluminum product, including those described in commonly-owned U.S. Pat. No. 6,455,148.

Other base materials, such as other metals (e.g., steel, titanium) may be used. Non-metallic materials may also be employed as the base 10. For example, plastics, glass, composites, fibers, ceramics, cements, laminates, particulates, meshes, sieves, aerogels, papers, and combinations thereof, to name a few, may be utilized as the base 10. In one approach, the base 10 may comprise mixtures of metals and non-metallic materials. For example, the base 10 may comprise metal sheets sandwiching a polymeric sheet therebetween. Conversely, the base 10 may comprise non-metallic materials sandwiching a metal material therebetween. Various other combinations exist to produce the base 10.

Organic Layer

The substrate 1 may include an organic layer 20 coupled to the base 10. An organic layer means a layer comprising predominately carbon-based or polymeric-based materials. In one embodiment, the organic layer 20 is liquid (e.g., water) impermeable and may protect the underlying base 10 from communication with liquid water or other materials that may permeate and/or contact a surface of the base 10. In one embodiment, the organic layer 20 comprises materials produced from commercially available products, such as latex-based paints, oil-based paints, silicon-based coatings, polymeric coatings, and others. In one embodiment, the organic layer 20 comprises a predetermined pigment and/or sheen so as to provide the body 10 with the desired color and/or gloss features.

Base-to-Self-Cleaning Layer

Figure 3:
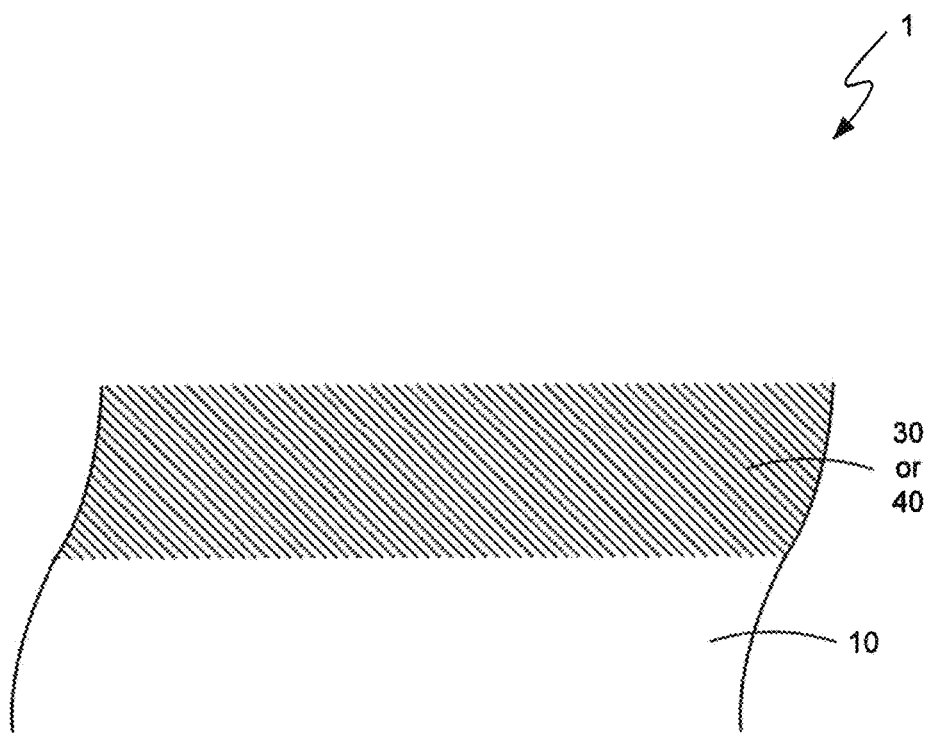
FIG. 3 is a schematic, side-view of an embodiment of a portion of a self-cleaning substrate.

In one embodiment, and as illustrated in FIG. 3, a substrate 1 includes a self-cleaning coating directly in contact with the base material 10. For example, a base 10 comprising an aluminum alloy may be directly coupled to either a passive self-cleaning layer 30 or an active self-cleaning layer 40.

Methods and Systems for Producing Self-Cleaning Substrates

Figure 4:
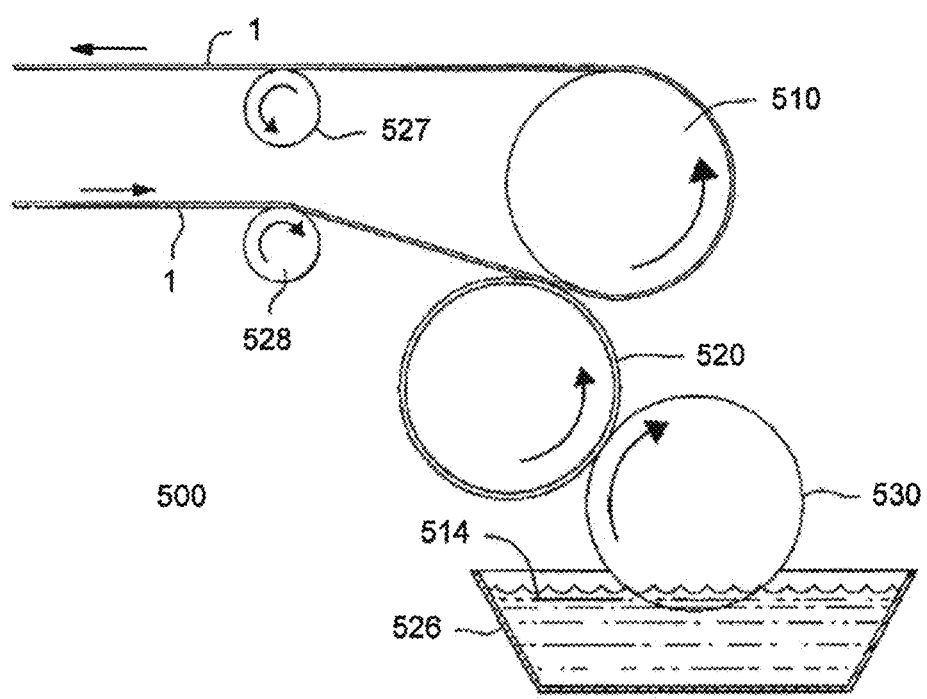
FIG. 4 is a schematic view of an embodiment of a roll coating system for producing a self-cleaning substrate.

To produce the self-cleaning substrates at commercially viable production rates, roll coating or spraying may be employed. One embodiment of a method and system for producing self-cleaning substrates via roll coating is illustrated in FIG. 4. In the illustrated embodiment, the roll coating system 500 coats a substrate 1 (e.g., a metal strip) via a back-up roll 510, an application or coating roll 520, and a pick-up/metering roll 530.

Liquid coatings are applied to substrates in a variety of methods including spray, dip, roll, knife, electrodeposition, vapor deposition, slot, and curtain coating. For metallic substrates (e.g., aluminum), liquid coating is commonly transported to the applicator roll via direct contact with a bath, by contact with a second roll that has contact with a bath, by direct spraying onto the roll, and the like. The rolls can have a metal, plastic or other type surface depending on the material to be coated. The various rolls in a roll coater are usually given common names associated with their function. In the four roll configuration shown in FIG. 5, the applicator roll 520 applies the coating to the web 1, and the backup, or impression roll 510 provides support for the web. If the roll 510 is deformable (rubber-covered) it is an impression roll while a non-deformable roll 510 is a backup roll. The pick-up/metering/fountain roll 530 lifts coating from the pan and meters coating with applicator roll 520. Since roll 530 has two functions, it can be called by more than one name. Depending on the number of rolls in the configuration, additional terms such as transfer roll and spreading roll are commonly used to describe the roll function in a specific industry. The narrow gap between roll 520 and roll 530 is termed the metering nip and the narrow gap between roll 530 and the web 1 is termed the coating nip. The back-up roll 510 supports the web 1 at the point of coating application. If space is maintained between the applicator roll 520 and the web 1, the back-up roll 510 is usually rigid, and there is no metal-to-metal contact. If the backup roll 510 is forced into near-contact with the 520 applicator roll, one of the two rolls is generally covered with deformable material to prevent metal to metal contact. Surfaces that move in the same direction at the point of nearest contact (rolls 520 and 530) are said to be moving in a forward direction, and those in opposite direction (roll 510 and the web 1) in a reverse direction. For the most uniform surface appearance, the applicator roll 520 moves in a reverse direction for continuous web coating. A description of various roll combinations and descriptions of fluid dynamics can be found in Liquid Film Coating, Ed. S. F. Kistler et al. "Knife and Roll Coating" by Dennis J. Coyle, pp 539-542 (1997).

In the area of coating metallic substrates for packaging and architectural end uses, metallic substrates are coated in one of two ways: as a continuous web or as approx. one $m^2$ (10 $ft^2$) sheets. A continuous "web" is rewound into a coil for subsequent trimming, slitting, or fabrication. Aluminum and steel are most commonly used as the substrate. Many coatings are applied on metal webs via forward or reverse roll coat with a deformable applicator roll 520.

For applying the self-cleaning coatings of the present disclosure, the applicator roll 520 generally has a pliable covering about 5-50 mm thick made from urethane, EPDM rubber or similar pliable material. The covering Shore A hardness, referred to as durometer, is about 45-85 (e.g., about 65), and the surface roughness $R_a$ is about 20-80 micro inches. $R_a$ is determined by first finding a mean line parallel to the general surface direction, dividing the surface such that the sum of the areas formed above the line is equal to the sum of the areas formed below the line, and computing the surface roughness summing the absolute values of all the areas above and below the mean line and dividing by the sampling length. This allows the applicator roll 520 to transfer liquid coating to the web 1 and conform to any web surface irregularities or roll irregularities to ensure complete coverage at a uniform film thickness.

In one embodiment, a continuously fed and moving fairly thick metal substrate sheet 1 passes over a pass, which can bend to roller pressure but is considered "non-deformable", in contrast to thin metal foil, paper, and the like line roll 528 to directly contact the applicator roll 520. Substrate thickness for a continuous process of this invention will generally be between about 0.1 mm to 0.8 mm, such as between about 0.100 mm to 0.500 mm. The coating rate will vary widely depending on the coating liquid viscosity and coating thickness desired, but will usually be from about 5 m/min to 500 m/min, such as from about 200 m/min to 400 m/min.

A source of self-cleaning coating precursor liquid 514 is provided and is usually held in an appropriate type container 526, although the coating liquid may, in some instances, be sprayed on an applicator roll. The precursor liquid 514 is generally aqueous and contains particulate matter, such as TiO2 or SiO2. The particulate size is generally in the range of 0.01 micron to about 0.2 to 0.3 micron. The precursor liquid is generally has a viscosity of about 1 centipoise (where one-thousand centipoises (cP) equals one Pascal-second). These precursor liquids, once applied, can be air-dried, UV (ultraviolet) or EB (electron beam) cured, heat cured, or the like, to provide the desired resulting "cured" coating. In one embodiment, the precursor liquid may contain a suitable surfactant to facilitate wetting of the substrate 1 surface, such as when an organic layer 20 is included. Preferred surfactants include those that are non-foaming. In one embodiment, the precursor liquid results in a passive self-cleaning coating, such as EASY CLEAN produced by PPG of Pittsburgh, Pa. In one embodiment, the precursor liquid results in for an active self-cleaning coating, such as THPC090402WC-A (Waterborne Photocatalyst Clear Coating-A) by TOTO, Japan, or TPX-220 TS or TPX-85 TS by Kon Corporation, Japan.

The container 526 may include an agitator (not illustrated), such as a stir rod, to facilitate even application of the precursor liquid and attainment of a suitable visual appearance. In one embodiment, the precursor liquid is continuously or near continuously agitated so as to facilitate mixing and production of iridescent-free coating surfaces. It has been found that coatings applied in the absence of agitation may not realize an iridescent-free appearance. In one embodiment, an air driven, slow speed agitator is used inside the coating reservoir in conjunction with a pumping system that uses cross coating pan flow. In other words the coating exits the pump and enters the left side of the coating pan. The coating exits the pan, and moves back to the coating reservoir on the right side of the coating pan.

The applicator roll 520 may reverse roll coat (rolls opposite to substrate) the moving substrate 1, as shown in FIG. 4 since the wet film thickness is more uniform than with forward roll coating due to the location of the film split meniscus. Forward roll coating with the applicator roll 520 is possible providing the coating hydrodynamic forces keep the surfaces separate. It is believed that the smoothness of the applicator roll 520 may facilitate maintenance of a stable coating bead/meniscus at high line speeds. As the applicator rolls turns faster, the tendency to drag air into the bead can disrupt the bead and cause a coating perturbation, or simply 'whip' air into the heretofore bubble-free liquid. The applicator roll generally will apply a pressure on the substrate 1 of from about 0.3 $kg/cm^2$ to 3.0 $kg/cm_2$ (4 psi to 40 psi).

The applicator roll 520 can be located/disposed directly opposite the metering roll 530 and a backup roll 510 as shown in the embodiment of FIG. 4, where for example only one side of the substrate is to be coated. The backup roll 510 supports the moving substrate 1. As mentioned previously, it is advantageous to locate the applicator roll 520 in close proximity, but not to permit actual contact with the backup roll 510, for both safety reasons and coating weight variations from roll out of roundness. It is helpful to arrange the rolls such that a wrap angle of about 2 to 10 degrees is maintained to ensure a stable coating process. Wrap angle is the portion of the roll circumference that is covered by the web, expressed in degrees. FIG. 4 shows a reverse roll coat configuration, and this is one of many possible configurations for roll coating substrates 1. For best coating appearance and uniformity, the applicator roll 520 moves in the opposite direction so that the web realizes a smoother coating. Depending on coating flow after application and quality standards, forward roll coating is may be practical. An additional top guide roll 527 may be used as is also shown in FIG. 4.

Figure 5:
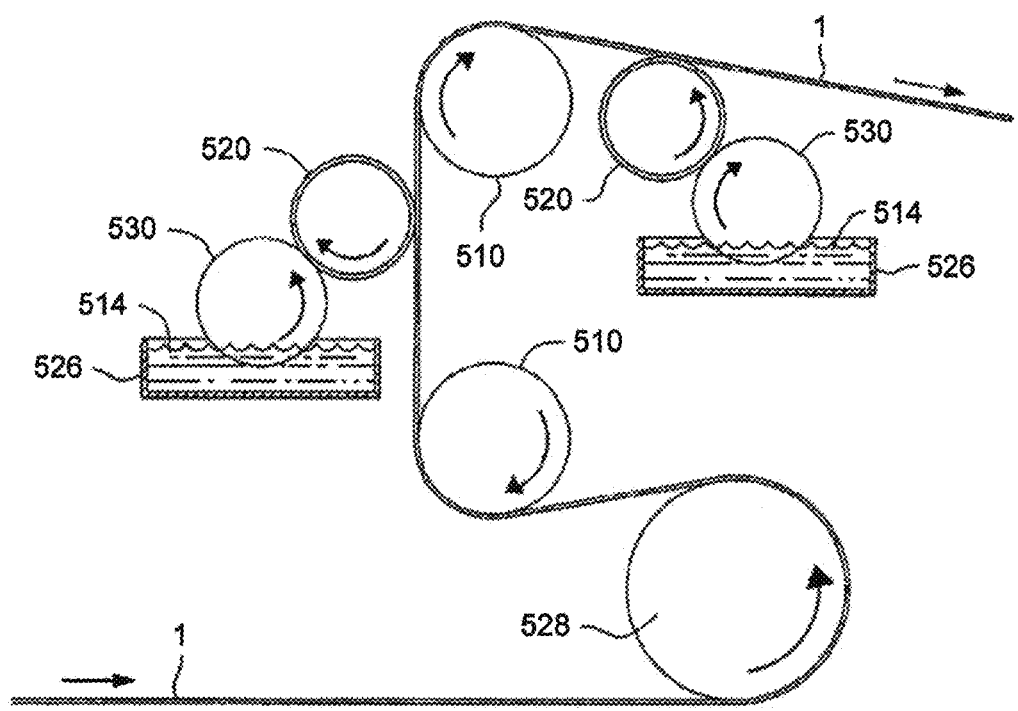
FIG. 5 is a schematic view of an embodiment of a roll coating system for producing a self-cleaning substrate.

FIG. 5 illustrates a coating configuration where both sides of the metallic web are reverse roll coated under sheet tension, where in that embodiment, both sides of the moving substrate are coated with the same or different coating liquids 514 and 514, using two separate metering rolls 530 and two separate applicator rolls 520, where each applicator roll 520 is spaced apart from dual backup rolls 510. As Shown, the metering rolls 530 and applicator rolls 520 move in opposing directions similarly to FIG. 4. In FIG. 5, the applicator rolls 520 move in the opposite direction as the moving substrate 1 which initially passes over optional turn roll 528. As shown, the initial (first to coat) applicator roll is disposed between at least two, here dual idler rolls 510.

In either instance, the distance between the applicator roll 520 and the metering roll 530 should be sufficiently short so as to facilitate a tight metering nip. A tight metering nip facilitates production of thin, uniform self-cleaning coating layers.

The precursor liquid 14 is preferably contacted with/ applied to a metering roll 530 to coat the metering roll 530. This metering roll 530 is the roll to which liquid coating is initially applied and can be of any type effective to carry the coating liquid to the applicator roll 520. The metering roll 530 can be porous or non-porous, but generally has a surface roughness sufficiently high to enable metering of sufficient precursor liquid to the applicator roll 520. In this regard the metering roll 530 may be nickel or chrome-steel plated, having a surface roughness ($R_a$) of about 150. The liquid 514 is held in an appropriate container 526 as shown in FIG. 5 and the metering roll moves in the forward direction with applicator roll 520, to facilitate smooth pick-up of precursor liquid 514.

The roll coating may produce material at a rate of at least about 10 feet per minute (fpm). In one embodiment, the roll coating produces material at a rate of at least about 25 fpm. In other embodiments, the roll coating produces material at a rate of at least about 50 fpm, or at least about 75 fpm, or at least about 125 fpm, or at least about fpm. In one embodiment, the roll coating may produce material at a rate of not greater than about 800 fpm. In other embodiments, the roll coating produces material at a rate of not greater than about 700 fpm, or not greater than about 600 fpm. In some instances, the pick-up roll and metering roll are the same roll. In other instances, the pick-up roll is separate from the metering roll.

When roll coating multiple coatings, such as organic coating, a barrier layer, and an active self-cleaning layer in series, the roll coating system can be arranged to have a series of rolls, ovens and/or coolers for each coating to facilitate the serial production of substrates having multiple coatings.

Below are some embodiments of metering-to-applicator roll configurations, for reverse roll coat and forward roll coat configuration, as appropriate:

| Configuration | Metering Roll | Applicator Roll |
|---|---|---|
| 1 | Smooth/rough Hard metering roll (chrome, steel, ceramic finish or other) | Smooth/rough soft (urethane/rubber/other) coated applicator roll |
| 2 | Smooth/rough Hard metering roll (chrome, steel, ceramic finish or other) | Smooth rough hard applicator roll (chrome, steel or ceramic finish, other) |
| 3 | Smooth/rough Hard metering roll (chrome, steel, ceramic finish or other) | Smooth/rough soft (urethane/rubber/other) coated applicator roll |

Figure 6:
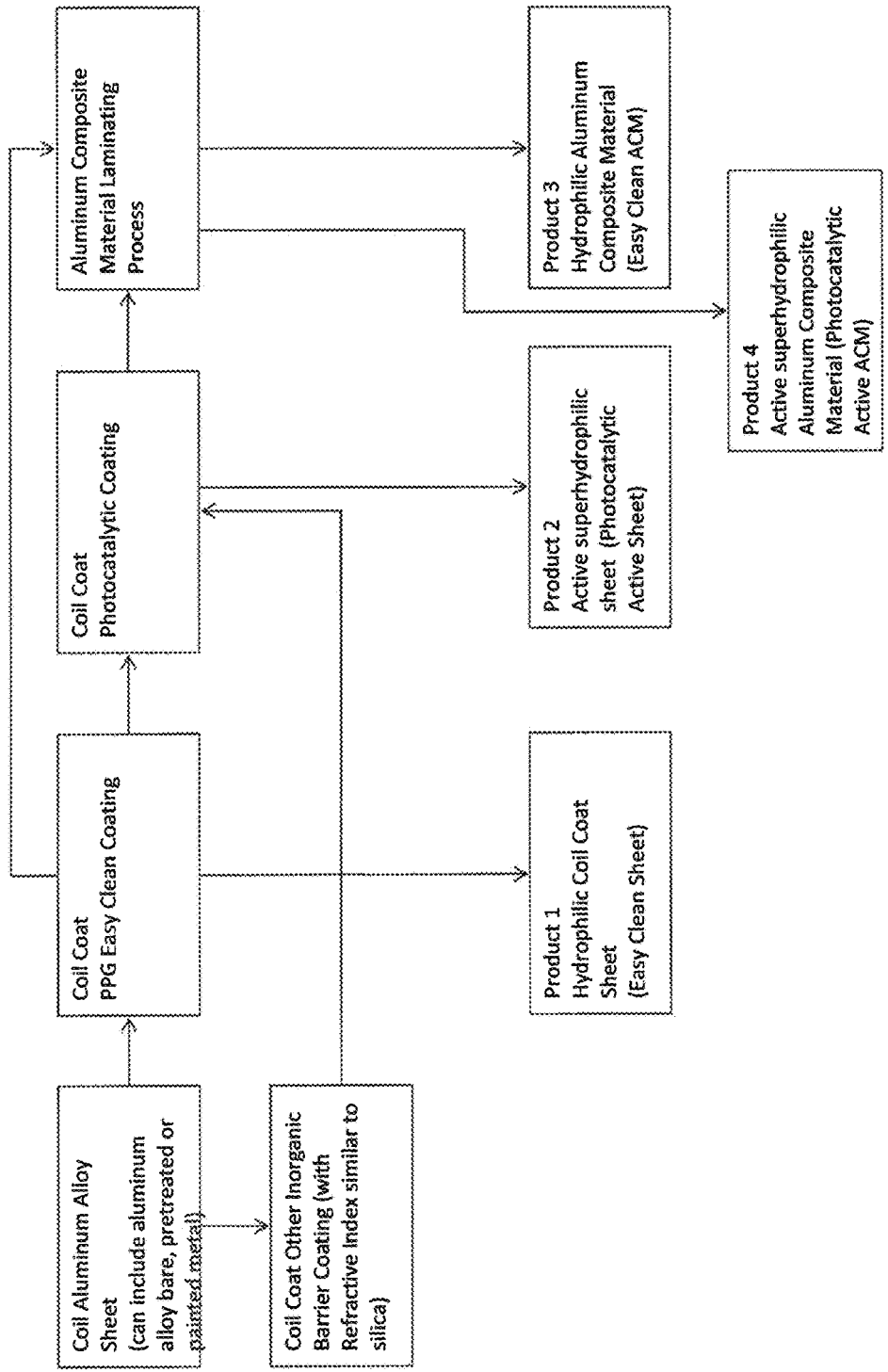
FIG. 6 is a flow chart illustrating various continuous methods of producing self-cleaning coatings.

Methods of producing various self-cleaning substrates are also illustrated in FIGS. 6 and 7. With respect to FIG. 6, a first sheet product may be produced by roll coating (coil aluminum alloy sheet). This first sheet product may include an organic layer, such as paint. A barrier coating is then roll coated onto the first sheet product (coil coat PPG EASY CLEAN COATING; coil coat other inorganic barrier coating with refractive index similar to silica). The process may end here, in which a hydrophilic coil coated sheet product is produced (EASY CLEAN Sheet). Alternatively, a self-cleaning coating may then be roll coated onto this intermediate product (coil coat photocatalytic coating). The process may end here, in which an active self-cleaning, superhydrophobic sheet product is produced (photocatalytically active sheet). Alternatively, the sheet product may be laminated with another product to form an aluminum composite material. This may be with only the barrier coating (hydrophilic aluminum composite materials; easy clean ACM) or with the barrier coating and the self-cleaning coating (active self-cleaning, superhydrophobic aluminum composite material; photocatalytically active ACM). As illustrated in FIG. 7, similar products could be achieved with batch spray processes.

Commercial Applications

The self-cleaning substrates disclosed herein may be used in a variety of commercial applications due to their low-cost production methodology. For example, the substrates could be used as an architectural product, including building exterior wall panels, including aluminum composite materials (ACM), foam panel, rib panels, soffit, and flashing, to name a few. Post-painted products and other factory manufactured building materials, such as roofing, vinyl siding, terracotta, and brick, may be a useful substrate for coating with a self-cleaning coating. Other substrates include materials used in metal signage, airplanes, automobiles (e.g., cars, trucks, trailers), highway sound barriers and guards, and industrial manufacturing venting systems, to name a few. Materials for interior programs may also benefit from self-cleaning layers, such as metal, laminate, hardware, plastic, paper based ceiling panels, doors, furniture, duct work for commercial buildings, and other non-wear surfaces. The substrate may also be a food container, such as an aluminum can, where, just before filling the can with a food or consumable liquid, a UV light may be used to clean the wall of pathogens, thereby extending shelf life and increasing product safety. The self-cleaning substrate may also be useful electronic devices, solar devices, wind powered devices, environmental sensors, battery technology and polymer electronics.

Various ones of the unique aspects noted hereinabove may be combined to yield visually appealing, self-cleaning substrates at commercially viable production rates. These and other aspects, advantages, and novel features of the disclosure are set forth in part in the description that follows and will become apparent to those skilled in the art upon examination of the following description and figures, or may be learned by practicing the disclosure.

Wettability Test

I. Materials and Apparatus

1. Squeeze type polyethylene bottle for each solution.
2. Solutions:

A—100% Distilled Water
   B—90% Distilled Water, 10% Denatured Ethyl Alcohol
   C—80% Distilled Water, 20% Denatured Ethyl Alcohol
   D—70% Distilled Water, 30% Denatured Ethyl Alcohol
   E—60% Distilled Water, 40% Denatured Ethyl Alcohol
   F—50% Distilled Water, 50% Denatured Ethyl Alcohol
   G—40% Distilled Water, 60% Denatured Ethyl Alcohol
   H—30% Distilled Water, 70% Denatured Ethyl Alcohol II. Procedure and Evaluation 1. Inclined coated substrate approximately 45° to the horizontal.
2. An "A" solution is applied across the entire width of the web from the polyethylene applicator using a rapid sweeping motion.
3. If the sheet is "A" wettable, the top edge of the stream will not depart from its straight line before 5 seconds after application.
4. If the stream pulls from its initial straight line before 5 seconds, the "B" solution is then tried on a fresh wrap of sheet. If a "B" solution fails to wet the surface, a "C" solution is tried and so on.

5. The solution which wets the entire web is the wettability rating.

EXAMPLES

Example 1—Spray Coating

Figure 8A:
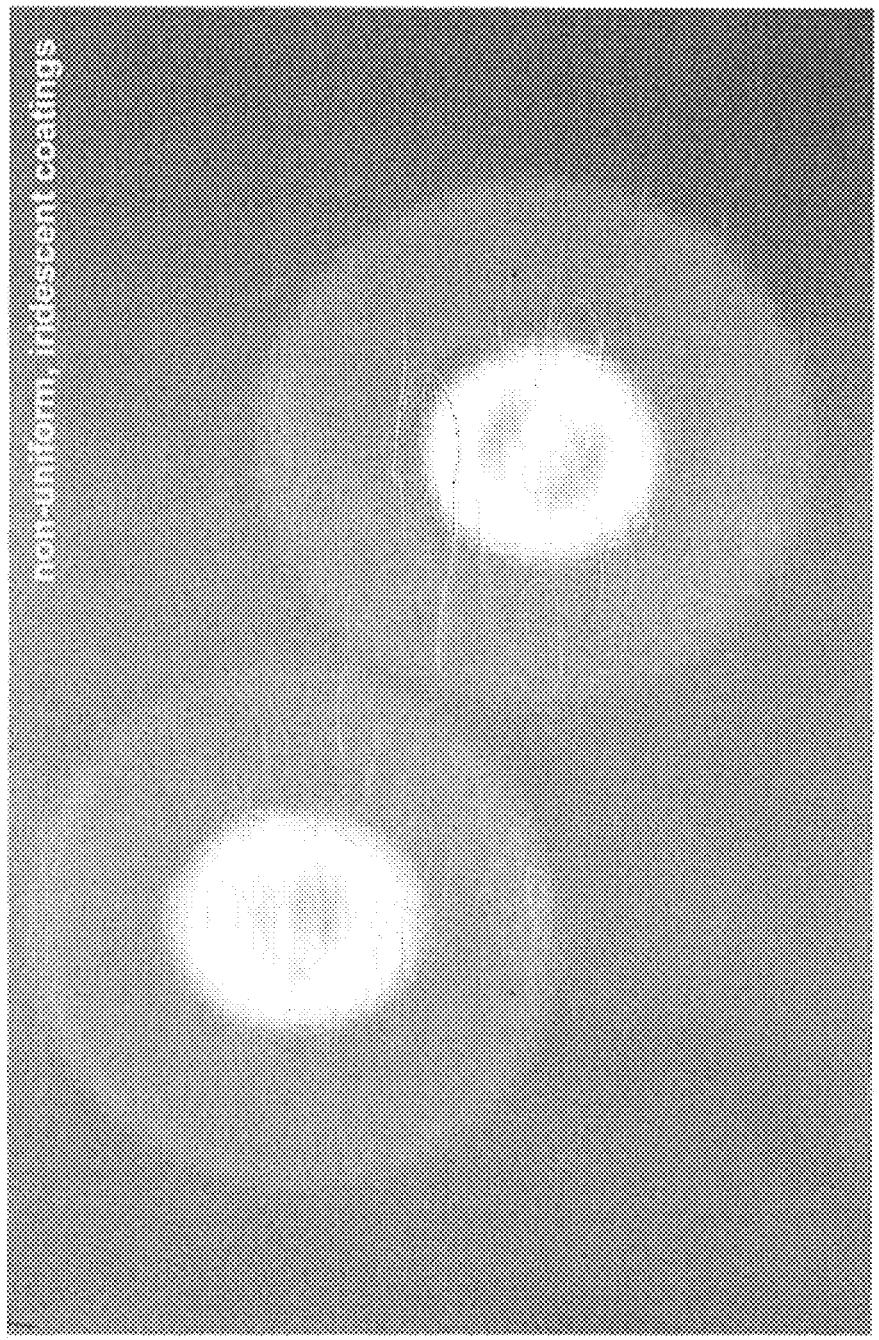
FIG. 8a is a photograph illustrating a self-cleaning substrate having non-uniform coatings, which are iridescence.
Figure 8B:
FIG. 8b is a photograph illustrating a self-cleaning substrate having non-uniform coatings, which are iridescence.

An aluminum alloy substrate is spray coated with PPG EASY COAT, and cured. The coating is iridescent. Photos of the iridescent coating are illustrated in FIGS. 8a-8b.

Example 2—Brush Rolled Substrates

Three cream-colored painted aluminum alloy substrates are produced. A first substrate is used as a control. A second substrate is coated with PPG EASY CLEAN via a roll brush and cured (passive coating). A second substrate is coated with PPG EASY CLEAN via a roll brush and cured (passive coating), and is then coated with TOTO THPC090402WC-A THPC090402WC-B via a roll brush and cured. Color and gloss change is tested via the three substrates by exposure to a QUV A bulb for a period of 1000 hours. As illustrated in FIGS. 9a-9b, the gloss of the underlying color is only slightly decreased, while the color change difference is negligible, both for single layer self-cleaning coatings, and dual-layer self-cleaning coatings.

Example 3—Roll Coating—Urethane Roll

Figure 10A:
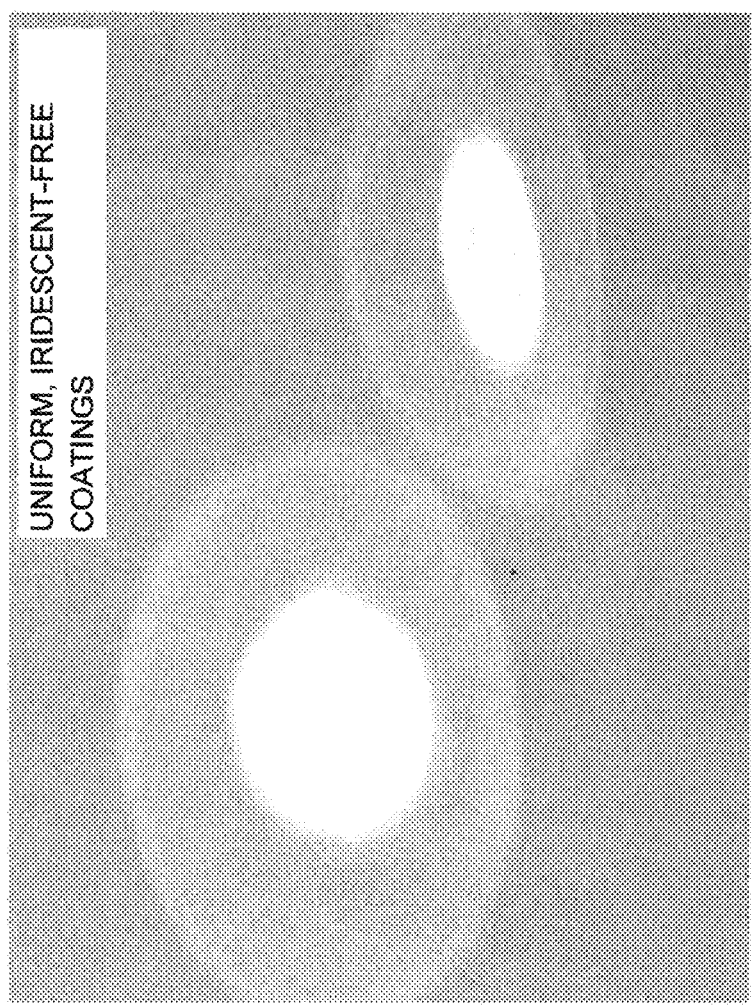
FIG. 10a is a photograph illustrating a self-cleaning substrate having a uniform, substantially iridescent-free self-cleaning layer.
Figure 10B:
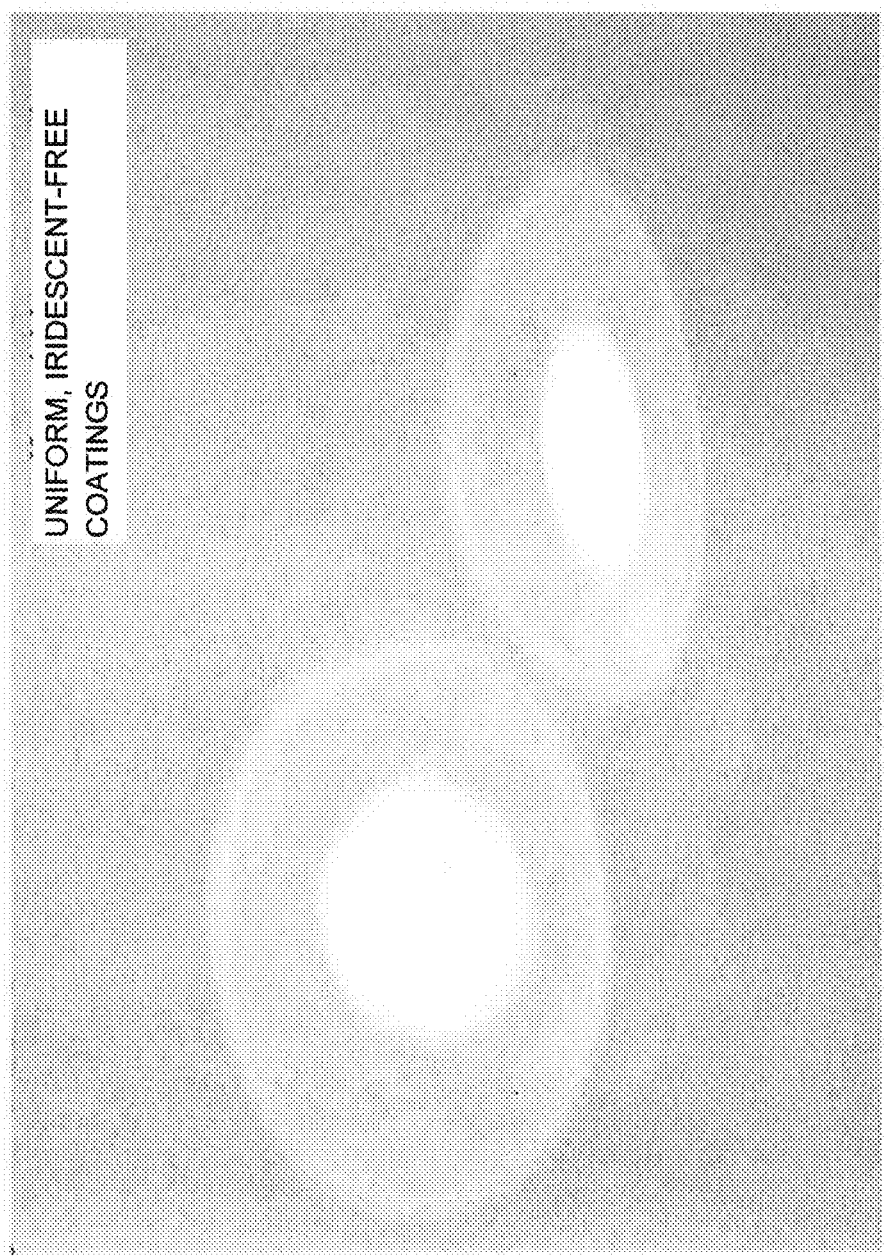
FIG. 10b is a photograph illustrating a self-cleaning substrate having a uniform, substantially iridescent-free self-cleaning layer.

Various painted aluminum alloy substrates are roll coated via a pilot coil roll coating line. The system used to roll coat is similar to that illustrated in FIG. 5. A barrier coating is applied to a colored aluminum sheet product having a predetermined color and gloss. The barrier coating is converted to a barrier layer. A self-cleaning coating is then applied to the barrier layer, and is then converted to a self-cleaning layer. The roll coating conditions and wettability results are provided in further detail below. The produced colored, self-cleaning substrates retain the predetermined color and gloss of the aluminum alloy sheet product. The colored, self-cleaning substrates are iridescent-free as illustrated in FIGS. 10a-10b. The colored, self-cleaning substrates have uniform self-cleaning layers as illustrated in FIGS. 10a-10b. In other words, the aluminum alloy substrates achieve an iridescent-free surface while retaining the color and gloss of the underlying paint. These uniform and visually appealing surfaces are generally achieved when there is a tight nip between the applicator roll and the metering roll.

Conditions for Example 3 Tests

Overview: The purpose of this trial is to determine if the self cleaning coating systems could be applied by a reverse roll coat coil operation. Small coils (300 linear feet) are produced for field testing. All four coatings applied well. Line trials confirmed that the rough chrome roll (150 Ra) assisted in successful roll coat application. Each coating improved the surface tension of the incoming substrate as determined by contact angle measurement. Surface energy went from around 45 dynes/cm to at least about 68 dynes/cm, as illustrated in FIG. 13. Curing temperature and time had little impact on the coatings appearance or surface energy change. Curing variations tested were: high oven temperature at a long dwell time (about 650° F. for about 11 seconds, PMT of about 410° F.) and low oven temperature at a short dwell time (about 250° F. for about 5.5 seconds, PMT of less than about 210° F.). Ten (10) small coils were produced for testing.

Line Conditions/Run Details
Line Speed of 150 FPM (11.2 second oven dwell time)
  i. Applicator roll at 50% over line speed
  ii. Pick-up roll at 40% under line speed
Both oven zones set 250° F.
  i. High velocity temperature: Varied—See FIGS. 11a-11d
  ii. Low velocity temperature: Varied—See FIGS. 11a-11d
Coatings:
  i. LRB 767—PPG UC108219 (barrier)
  ii. LRB 768—Toto THPC090402WC—water base (self-cleaning)
  iii. LRB 769—Kon TPX 220TS (self-cleaning)
  iv. LRB 770—Toto TPCA001 solvent base
Reducing Solvent: None for all coatings
Application Viscosity: No adjustment required; run as received, water thin at about 71° F.
Roll Types:
  i. Top side applicator=urethane 65 durometer, 11.0 inch diameter
  ii. Top side pickup roll chrome plated, 150 Ra, 6.0 inch diameter
  iii. Bottom side applicator, urethane 55 durometer, 6.0 inch diameter
  iv. Bottom side pickup roll chrome plated, 150 Ra, 6.0 inch diameter
Roll Direction:
  i. Reverse roll coated, top & bottom side coated against sheet tension
Roll Speeds: Various—See FIGS. 11a-11b
Substrate:
  i. LRB 767 trials 1-7 AAP's polyester white coated surface, 0.035"
  ii. LRB 767 trials 8-11 AAP's KYNAR white coated surface, 0.020"
  iii. LRB 768 trials 1-4 ATC's LRB 767 T-3
  iv. LRB 768 trials 5-6 ATC's LRB 767 T-10
  v. LRB 769 trials 1-3 ATC's LRB 767 T-3
  vi. LRB 769 trial 4 ATC's LRB 767 T-9
  vii. LRB 770 trials 1-4 ATC's LRB 767-9
  viii. LRB 770 trials 5-7 ATC's LRB 767 T-2
Resulting products (300 linear foot coils of each of the following):
  i. LRB767-1 PPG EZ CLEAN UC1.08219 over polyester white
  ii. LRB767-2 PPG EZ CLEAN UC108219 over polyester white
  iii. LRB767-3 PPG EZ CLEAN UC108219 over polyester white
  iv. LRB767-4 PPG EZ CLEAN UC108219 over polyester white
  v. LRB767-5 PPG EZ CLEAN UC108219 over polyester white
  vi. LRB767-8 PPG EZ CLEAN UC108219 over KYNAR white
  vii. LRB767-9 PPG EZ CLEAN UC108219 over KYNAR white
  viii. LRB767-10 PPG EZ CLEAN UC108219 over KYNAR white
  ix. LRB 768-4 PPG UC108219+Toto THPC090402WC over polyester white
  x. LRB 768-5 PPG UC108219+Toto THPC090402WC over KYNAR white xi. LRB 769-3 PPG UC108219+Kon 90603 over polyester white
xii. LRB 769-4 PPG UC108219+Kon 90603 over KYNAR white
xiii. LRB 770-4 PPG UC108219+Toto TPCA001 over KYNAR white Product Observations:
LRB 767 sample:
  i. PPG EZ-CLEAN, UC108219 (Trials 1-11)
    1. Good coating flow (slight crows feet appearance)
    2. Coating viscosity was stable in the pan
    3. Coating was easy to clean up with water followed by a MEK wipe
    4. Uniform gloss
    5. Appearance better over matte finish
    6. Wipes off directly after curing (allow longer time to cure)
LRB 768 sample:
  i. Toto THPC090402WC-A (Trials 1-6)
    1. Good coating flow (slight crows feet appearance)
    2. Coating viscosity was stable in the pan
    3. Coating was easy to clean up with water followed by a MEK wipe
    4. Uniform gloss
    5. Two component mixture
    6. Severe foaming in pump bucket
    7. Appearance better over matte finish
    8. Wipes off directly after curing
LRB 769 sample:
  i. KON TPX-220TS (Trials 1-4)
    1. Good coating flow (slight crows feet appearance)
    2. Coating viscosity was stable in the pan
    3. Coating was easy to clean up with water followed by a MEK wipe
    4. Uniform gloss
    5. Appearance better over matte finish
    6. Wipes off directly after curing
LRB 770 sample:
  i. TOTO TPCA001 (Trials 1-7)
    1. Good coating flow
    2. Coating viscosity was stable in the pan
    3. Coating was easy to clean up with MEK
    4. Uniform gloss
    5. Appearance better over matte finish
    6. Wipes off directly after curing Example 4—Roll Coating Various painted aluminum alloy substrates are roll coated via a pilot coil roll coating line. The system used to roll coat is similar to that illustrated in FIG. 5, except that the applicator roll is hard roll. The roll coating conditions are provided in detail below. It is difficult to achieve iridescent-free surfaces—the hard-to-hard rolling does not facilitate uniform and thin application of the precursor liquids. A urethane roll was then used, resulting in good uniformity and thickness. After application of a barrier coating (PPG Easy Clean), a self-cleaning coating (TOTO) is applied to the substrate via roll coating. The TOTO coating is applied without surfactant and is adherent to the surface of the barrier layer.

Conditions for Example 4 Test

Overview: The purpose of this trial is to:
Determine whether self cleaning coatings could be applied by a reverse roll coat coil operation containing two hard rolls;
determine whether the surfactant portion of the self-cleaning coating (TOTO part B) of the two component system (TOTO HYDROTECT) was necessary to wet the pre-coated substrate. The substrate was previously coated with PPG's UC108219 coating; and
Modify the pumping equipment to minimize foam build while using this two component coating system.

Line trials utilizing the two hard rolls has mixed results. The coating are successfully applied, but there is no control of coating film thickness. This application method produces sheet with areas of non-uniform layers. Roll roundness appears to be the issue; without a deformable roll the unevenness is difficult to remove. While in the two hard roll configuration, the rough pick-up roll is worn smooth after several hours of operation. Adding the surfactant to the self-cleaning coating did not appear to correct the uneven thickness issue. This suggested that surfactant is not necessary when applying it to a barrier layer made from PPG's UC108219 EZ-CLEAN barrier coating. Extension of the pumping system return pipe reduced foam build when using the TOTO self-cleaning coating with surfactant. The return pipe was extended below the coating surface inside the pump reservoir. A small coil was produced, identified as LRB776-8, using part A of the TOTO coating only (i.e., no surfactant). A urethane applicator roll was used to coat this coil.

Line Conditions/Run Details
Line Speed of 150 FPM (11.2 second oven dwell time)
  i. Applicator roll at 50% over line speed
  ii. Pick-up roll at 40% under line speed
  iii. Oven Temperature: 250° F. (high and low)
  iv. Coating: Toto THPC090402WC
  v. Reducing Solvent: None
  vi. Application Viscosity: No adjustment required; run as received, water thin at about 71° F.
  vii. Roll Types:
    1. Top side applicator, ceramic, 11.0 inch diameter
    2. Top side applicator, urethane 65 durometer, 11.0 inch diameter
    3. Top side pickup roll, chrome plated, 150 Ra, 6.0 inch diameter
    4. Roll Direction Reverse roll coated against sheet tension
  viii. Roll Speeds: Various—See FIG. 12
  ix. Substrate:
    1. LRB 776 trials 1-8 AAP's KYNAR white surface, 0.020", pre-coated with PPG's UC108219
Product Observations
LRB 776—No. 1:
  i. Toto THPC090402WC-A, part A-only, two hard rolls (Trials 1-2)
    1. Good coating flow (slight crows feet appearance)
    2. Coating viscosity was stable in the pan
    3. Coating was easy to clean up with water followed by a MEK wipe
    4. Uniform gloss
    5. No foaming in the pump reservoir
    6. Uneven coating thickness
    7. No ability to squeeze out roll imperfections LRB 776—No. 2:
  i. Toto THPC090402WC-A, two hard rolls (Trials 3-5);
    1. Added various amounts of TOTO part B to 4 gallons of TOTO part A
    2. No coating uniformity improvement was observed.
LRB 776—No. 3:
  i. Toto THPC090402WC-A, part A only, urethane applicator roll (Trials 6-8)
    1. Even coating thickness
    2. Good coating flow (slight crows feet appearance)
    3. Coating easily wet the pre-coated sheet
    4. Uniform gloss
    5. No foaming in the pump reservoir While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A method comprising:
   (a) first roll coating an inorganic barrier coating liquid onto at least a portion of an initial colored sheet product, wherein the inorganic barrier coating liquid is in the form of an aqueous solution;
     (i) wherein the initial colored sheet product comprise an organic layer disposed on a base material;
     (ii) wherein the initial colored sheet product comprises a predetermined color and a predetermined gloss;
   (b) first converting the inorganic barrier coating liquid into an inorganic barrier layer, thereby producing an intermediate product, wherein, after the first converting step, the inorganic barrier layer is located on at least a portion of the organic layer, and wherein, after the first converting step, the intermediate product retains the predetermined color and retains the predetermined gloss of the initial colored sheet product;
   (c) second roll coating a self-cleaning coating liquid onto at least a portion of the inorganic barrier layer, wherein the self-cleaning coating liquid is an aqueous-based liquid consisting essentially of water, titanium dioxide particles, silica and optional surfactant, and wherein the second roll coating step comprises uniformly applying the self-cleaning coating liquid to the inorganic barrier layer; and
   (d) second converting the self-cleaning coating liquid into a self-cleaning layer, thereby producing a final sheet product, wherein, after the second converting step, the self-cleaning layer is located on at least a portion of the inorganic barrier layer, and wherein, after the second converting step, the final sheet product retains the predetermined color and retains the predetermined gloss of the initial colored sheet product, and wherein the final sheet product is iridescent free.

2. The method of claim 1, wherein the base material is steel-based.

3. The method of claim 1, wherein the base material is aluminum-based.

4. The method of claim 1, wherein the base material is titanium-based.

5. The method of claim 1, wherein the base material is non-metallic based.

6. The method of claim 5, wherein the base material comprises at least one of a plastic and a glass.

7. The method of claim 1, wherein the base material comprises a mixture of metals and non-metallic materials.

8. The method of claim 7, wherein the base material comprises metal sheets sandwiching a polymeric sheet.

9. The method of claim 7, wherein the base material comprises non-metallic materials sandwiching a metal material.

10. The method of claim 1, wherein the inorganic barrier coating liquid is in the form of an aqueous solution comprising silica.

11. The method of claim 10, comprising:
   agitating the aqueous-based self-cleaning coating liquid inside a coating reservoir; and
   applying the aqueous-based self-cleaning coating liquid to the inorganic barrier layer.

12. The method of claim 11, wherein the agitating step comprises continuous agitation.

13. The method of claim 1, wherein the organic layer is a colored layer.

14. The method of claim 1, wherein the organic layer comprises polymeric-based materials.

15. The method of claim 1, wherein, after the second converting step (d), the titanium dioxide particles are uniformly dispersed throughout the self-cleaning layer.

16. The method of claim 1, wherein the inorganic barrier layer has a thickness of from 0.1 to 1.0 microns.

17. The method of claim 1, wherein the inorganic barrier layer has a thickness of from 0.2 to 1.0 microns.

* * * * *